US012468173B2

(12) United States Patent
Dietz et al.

(10) Patent No.: US 12,468,173 B2
(45) Date of Patent: Nov. 11, 2025

(54) SYSTEM AND METHOD FOR AERIAL LIGHT SHOWS WITH OCCLUSION AND TRANSPARENCY

(71) Applicant: Verge Inc., Buda, TX (US)

(72) Inventors: Paul Henry Dietz, Redmond, WA (US); Jennifer Alford, Fort Worth, TX (US)

(73) Assignee: Verge Inc., Buda, TX (US)

( * ) Notice: Subject to any disclaimer, the term of this patent is extended or adjusted under 35 U.S.C. 154(b) by 444 days.

(21) Appl. No.: 17/969,583

(22) Filed: Oct. 19, 2022

(65) Prior Publication Data
US 2023/0130059 A1    Apr. 27, 2023

Related U.S. Application Data

(60) Provisional application No. 63/270,204, filed on Oct. 21, 2021.

(51) Int. Cl.
*G02B 30/56* (2020.01)
*B64C 39/02* (2023.01)
(Continued)

(52) U.S. Cl.
CPC .......... *G02B 30/56* (2020.01); *B64C 39/024* (2013.01); *B64D 47/02* (2013.01);
(Continued)

(58) Field of Classification Search
CPC ...... G02B 30/56; B64C 39/024; B64D 47/02; G03B 21/2033; G03B 21/2053; G03B 29/00; B64U 2101/24; B64U 2201/102
(Continued)

(56) References Cited

U.S. PATENT DOCUMENTS

| 2014/0233099 A1* | 8/2014 | Stark | G09F 19/18 362/555 |
| 2014/0236388 A1* | 8/2014 | Wong | B64D 47/02 244/17.23 |

(Continued)

FOREIGN PATENT DOCUMENTS

| KR | 20210069149 A | * | 6/2021 | ............. G03B 21/14 |

OTHER PUBLICATIONS

S. Zollmann, C. Hoppe, T. Langlotz and G. Reitmayr, "FlyAR: Augmented Reality Supported Micro Aerial Vehicle Navigation," in IEEE Transactions on Visualization and Computer Graphics, vol. 20, No. 4, pp. 560-568, Apr. 2014. (Year: 2014).*

*Primary Examiner* — Magda Cruz
(74) *Attorney, Agent, or Firm* — Seed Intellectual Property Law Group LLP

(57) ABSTRACT

An aerial light show system includes aerial vehicles configured to move along paths consisting of positions while emitting light beams to present an aerial light show of a virtual 3D scene. Each aerial vehicle includes a light source configured to project multiple light beams in multiple specified directions, respectively, wherein the brightness and/or color of each of the multiple light beams is independently controllable. The aerial light show system includes a control system configured to control the movement of the aerial vehicles, to modify the brightness and/or color of (e.g., dim or turn off) a light beam of each aerial vehicle at each position projected in a specified direction that is occluded by the virtual 3D scene, and to not modify the brightness and/or color of a light beam of each aerial vehicle at each position projected in a specified direction that is not occluded by the virtual 3D scene.

27 Claims, 18 Drawing Sheets

(51) Int. Cl.
  *B64D 47/02* (2006.01)
  *G03B 21/20* (2006.01)
  *G03B 29/00* (2021.01)
  *G05D 1/00* (2024.01)
(52) U.S. Cl.
  CPC ..... *G03B 21/2033* (2013.01); *G03B 21/2053* (2013.01); *G03B 29/00* (2013.01); *G05D 1/0094* (2013.01); *G05D 1/104* (2013.01)
(58) Field of Classification Search
  USPC ..................................................... 353/7, 13
  See application file for complete search history.

(56) References Cited

U.S. PATENT DOCUMENTS

2020/0033891 A1* 1/2020 Gurdan .................. B64U 10/13
2021/0129989 A1* 5/2021 Schuett .................. G03B 35/12

* cited by examiner

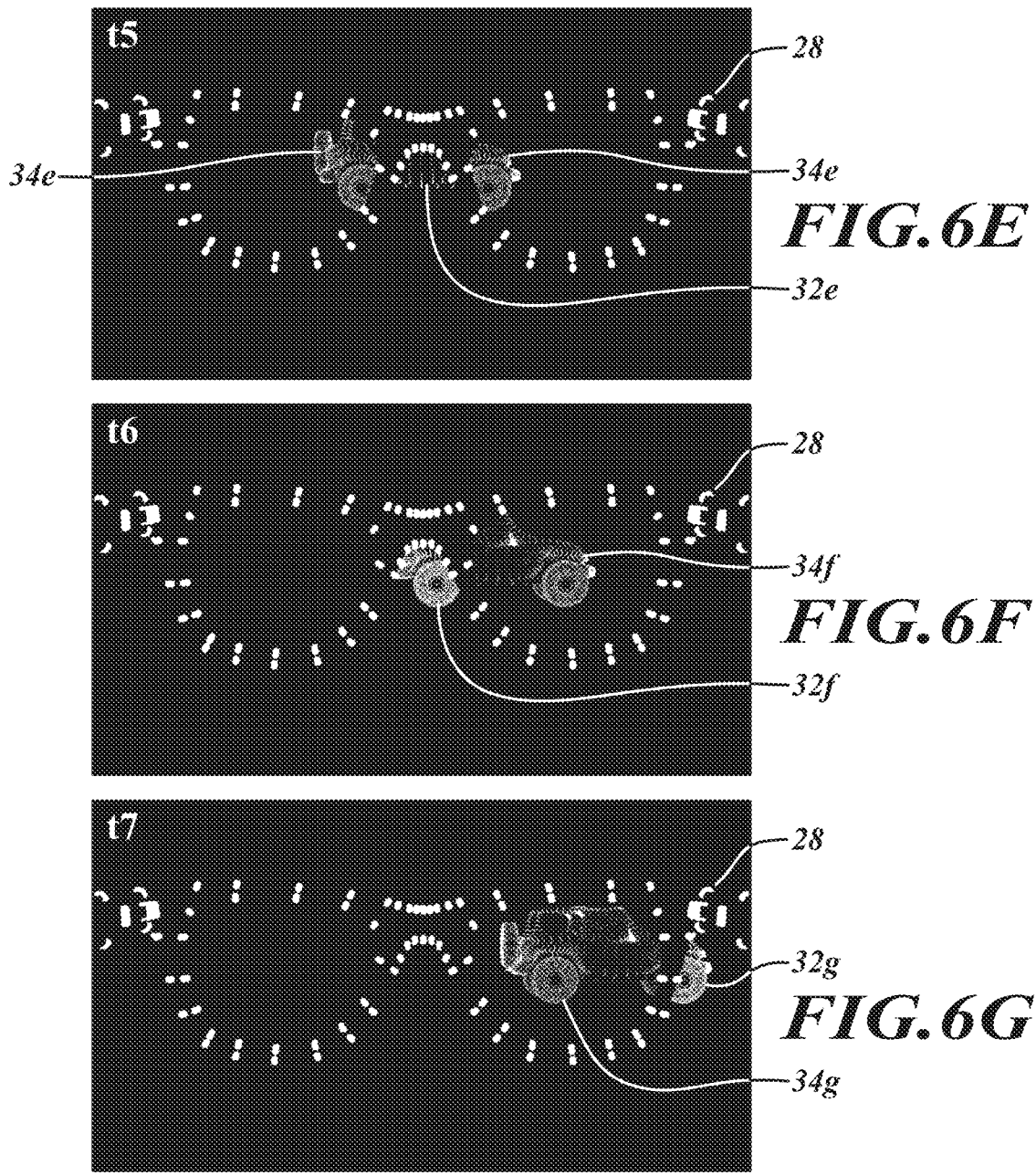

SYSTEM AND METHOD FOR AERIAL LIGHT SHOWS WITH OCCLUSION AND TRANSPARENCY

BACKGROUND

Technical Field

This disclosure relates to aerial light show systems and methods and, more particularly, to systems and methods for presenting aerial light shows of virtual 3D scenes capable of addressing occlusion and transparency imparted by the virtual 3D scenes.

Description of the Related Art

Drone light shows use quadcopters or other well-controlled flying platforms to position controlled lighting in the night sky. Often, the drone-based lights are arranged to outline a three-dimensional (3D) scene, which may be comprised of multiple virtual objects, some of which are themselves organized in a hierarchy of articulated parts to represent sophisticated figures that can be animated. One example is the outline of a gigantic human runner, running in slow motion across the sky.

To convey the illusion of a three-dimensional figure from many viewing angles, the drones can be positioned to outline the three-dimensional shape. These shows are viewed at a great distance. The three-dimensional object is purely virtual but the human perceptual system "fills in" the missing parts to perceive the intended figure. An audience member's perception of it is merely suggested by the emission of carefully placed lights from each drone position. However, when light from the drone is observed at a viewpoint, which light would normally be occluded by the three-dimensional shape(s) or object(s) themselves, the visual effect at that viewpoint is diminished greatly and the illusion is at risk of being broken. A viewer may not perceive the intended figure, but rather a collection of individual lighted points including those lighted points which should be not visible to the viewer. Using the example of a figure of a human runner, with current state of the art, a viewer who observes the running figure from the left side of the 3D scene will see the lights outlining both the left and right arms as being at roughly the same distance, despite that the right arm should not be visible being blocked by the runner's body and left arm. This makes the two arms hard to distinguish from each other and creates a less than ideal 3D illusion. While motion helps the brain recognize the figure, the 3D scene in motion still appears more as a lit 2D outline rather than a solid 3D figure.

The familiar shape of a cube provides a good example of the problem. FIG. 1 shows a solid 3D cube 1a with 8 corners, 12 edges and 6 faces, which is depicted on 2D paper with lines representing the edges. While only the edges are drawn, humans readily perceive the 3D object by "filling in" what is implied. Unfortunately, when all 12 edges are drawn as in the cube 1a, there is ambiguity. The solid 3D cube 1a can be interpreted as a cube with its bottom left face 1BL as the front face closest to the viewer, or with its top right face 1TR as the front face closest to the viewer. We can resolve the ambiguity by drawing only the edges that would be visible if this were a solid object, as in a cube 1b, wherein it is clear that the bottom left face 1BL is the front face. In graphics, this is often referred to as "hidden line removal" and is a well-established technique for improving the look of 3D objects rendered on a 2D surface.

Similar problems can arise when presenting aerial light shows where lights are placed on surfaces and along edges of virtual objects in a three-dimensional space. FIG. 2 shows representations of a cube in the sky created with lights placed along the cube's edges in 3 dimensions when viewed from far away. Because the viewer is assumed to be far away, there is little disparity between the views from the left eye versus the right eye, making it difficult, if not impossible, to gauge a relative distance to each light. (A good example of this phenomenon is that stars and planets all look about the same distance away to the naked eye, even though the relative distances can span many orders of magnitude.) Without depth perception, a cube 2a in FIG. 2 is ambiguous in the same way as the cube 1a in FIG. 1.

With a cube 2b in FIG. 2, we resolve the ambiguity by removing the hidden lines, just as was done with the cube 1b in FIG. 1, except now we are removing lines in three-dimensional space. To do this, one must assume a particular viewpoint to know which lines should be occluded by the 3D object itself and thus removed. A cube 2c in FIG. 2 illustrates the same lines illuminated as in the cube 2b but viewed from a different viewpoint. The solid cube illusion is broken and the image is confusing.

The fundamental problem with creating the illusion of a solid object using lights in the sky is that which lights should be visible is not the same for all viewpoints. From different viewpoints different edges, surfaces, and vertices should be visible, and there is no way to create this effect with aerial vehicles that have lights that shine uniformly in all directions.

The present disclosure is directed to providing aerial light show systems and methods capable of rendering realistic and unambiguous 3D scenes in the sky to each of viewers at different viewpoints.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to one aspect, a light show system such as an aerial light show system is provided. The aerial light show system includes aerial vehicles configured to move along paths consisting of multiple positions while emitting light beams to present an aerial light show of a virtual 3D scene. Each aerial vehicle includes a light source configured to project multiple light beams in multiple specified directions, respectively, wherein the brightness and/or color of each of the multiple light beams is independently controllable. The aerial light show system includes a control system configured to control the movement of the aerial vehicles along the paths consisting of the multiple positions. The control system is configured to control the brightness and/or color of each of the multiple light beams of the light source of each aerial vehicle at each of at least one of the multiple positions of the path traveled by the aerial vehicle. The positions of the aerial vehicles are related to the virtual 3D scene to be viewed in the aerial light show, such that each position determines if any of the multiple light beams emitted from the position are occluded by objects of the virtual 3D scene. The control of the brightness and/or color includes: modifying the brightness and/or color of a light beam of each aerial vehicle at each position projected in a specified direction that is occluded by the virtual 3D scene, and not modifying the brightness and/or color of a light beam of each aerial vehicle at each position projected in a specified direction that is not occluded by the virtual 3D scene.

According to another aspect, a vehicle such as an aerial vehicle is provided. The aerial vehicle includes a processor configured to control movement of the aerial vehicle along a path consisting of multiple positions while emitting light beams to present an aerial light show of a virtual 3D scene. The aerial vehicle includes a light source controlled by the processor and configured to project multiple light beams in multiple specified directions, respectively. The processor is configured to control the brightness and/or color of each of the multiple light beams of the light source at each of at least one of the multiple positions of the path traveled by the aerial vehicle. The control of the brightness and/or color includes: modifying the brightness and/or color of a light beam of each aerial vehicle at each position projected in a specified direction that is occluded by the virtual 3D scene, and not modifying the brightness and/or color of a light beam of each aerial vehicle at each position projected in a specified direction that is not occluded by the virtual 3D scene.

According to another aspect, a method for a light show is provided, such as a method for an aerial light show. The method includes:
creating a virtual 3D scene;
placing lights in the virtual 3D scene;
assigning paths consisting of multiple positions to be traveled by aerial vehicles including light sources which correspond to the lights placed on the virtual 3D scene to present an aerial light show of the virtual 3D scene, wherein the light source of each aerial vehicle is configured to project multiple light beams in multiple specified directions, respectively, and the brightness and/or color of each of the multiple light beams is independently controllable;
for each aerial vehicle and for each of at least one of the multiple positions of the path traveled by the aerial vehicle, rendering a pattern of the brightness and/or color of the multiple light beams of the light source of the aerial vehicle, wherein the brightness and/or color of a light beam projected in a specified direction that is occluded by the virtual 3D scene is modified, and the brightness and/or color of a light beam projected in a specified direction that is not occluded by the virtual 3D scene is not modified; and
loading to an aerial light show control system the paths of the aerial vehicles and the patterns of the brightness and/or color of the multiple light beams of the light source for each of at least one of the multiple positions traveled by the aerial vehicles.

BRIEF DESCRIPTION OF THE DRAWINGS

FIGS. 6A-6G illustrate a time series of views from one viewpoint of an aerial light show of a virtual 3D scene of sunglasses through which a moving truck is visible, which is achievable according to the present invention;

DETAILED DESCRIPTION

Figure 3A:
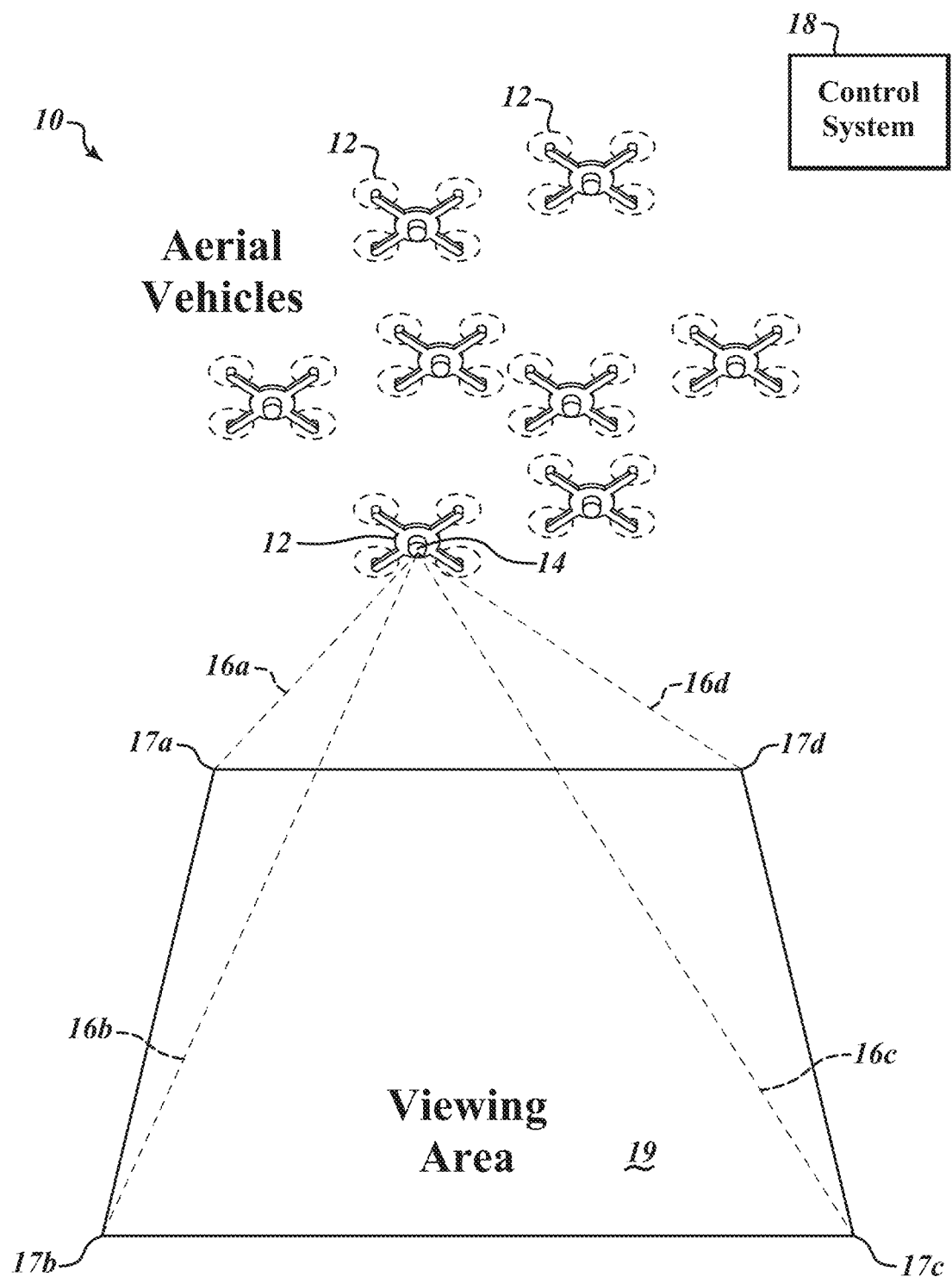
FIG. 3A schematically illustrates an overall configuration example of an aerial light show system including aerial vehicles each including a light source configured to project multiple light beams in multiple specified directions, respectively, and a control system configured to control the movement of the aerial vehicles and to control the brightness and/or color of each of the multiple light beams of the light source of each aerial vehicle.

FIG. 3A schematically illustrates an overall configuration example of an aerial light show system 10 including aerial vehicles 12 configured to move along paths consisting of multiple positions while emitting light beams to present an aerial light show of a virtual 3D scene. The aerial vehicles 12 each includes a light source 14 (or light sources 14) configured to project multiple light beams 16a-16d in multiple specified directions, respectively, wherein the brightness and/or color of each of the multiple light beams is independently controllable. Of course, the number of light beams emitted from each light source 14 is not limited to four (16a-16d) as included for ease of illustration, and any (large) number of multiple light beams 16a-16x may be projected in multiple specified directions, respectively. As illustrated, the multiple light beams 16a-16x projected in multiple specific directions are visible at multiple viewpoints 17a-17x, respectively, within a viewing area 19. The audience is in the viewing area 19 from which the aerial light show is intended to be viewed. While pictured as a flat, rectangular area, the viewing area 19 can be any shape, and may even have unconnected regions. The aerial vehicles 12 are flown in a region of the sky that is visible to the audience.

The aerial light show system 10 includes a control system 18 configured to control the movement of the aerial vehicles 12 along the paths consisting of the multiple positions, and to control the brightness and/or color of each of the multiple light beams 16a-16x of the light source 14 of each aerial vehicle 12 at each of at least one of the multiple positions of the path traveled by the aerial vehicle 12. Specifically, the control of the multiple light beams 16a-16x includes: modifying the brightness and/or color of a light beam 16 of each aerial vehicle 12 at each position projected in a specified direction that is occluded by the virtual 3D scene, and not modifying the brightness and/or color of a light beam 16 of each aerial vehicle 12 at each position in a specified direction that is not occluded by the virtual 3D scene. The control system 18 may include a wireless show controller which may be on the ground and is in communication with the aerial vehicles 12 to control the progress of the aerial light show. It may be a control system that provides information to aerial vehicles 12 in advance, with progress of the aerial light show controlled by controls on the aerial vehicles 12.

In various embodiments of the present invention, a combination of hardware, software and methods may be used to create an aerial light show depicting an intended 3D scene. To present an aerial light show, the aerial vehicles 12 must be sent to appropriate locations from which they emit light from their light sources 14 (e.g., projectors) to create the appropriate 3D scene. As will be more fully described below, various embodiments of the invention provide methods for determining the light patterns emitted from each light source 14 (e.g., projector) dependent on the position of the light source 14 relative to the modeled 3D scene. The light patterns are determined from the interactions between the light beams 16a-16x and the 3D model and, also, restricted to the desired viewing area 19. These light patterns will provide appropriate content for all viewers in the viewing area 19 irrespective of their individual viewpoints (vantage points).

Figure 3B:
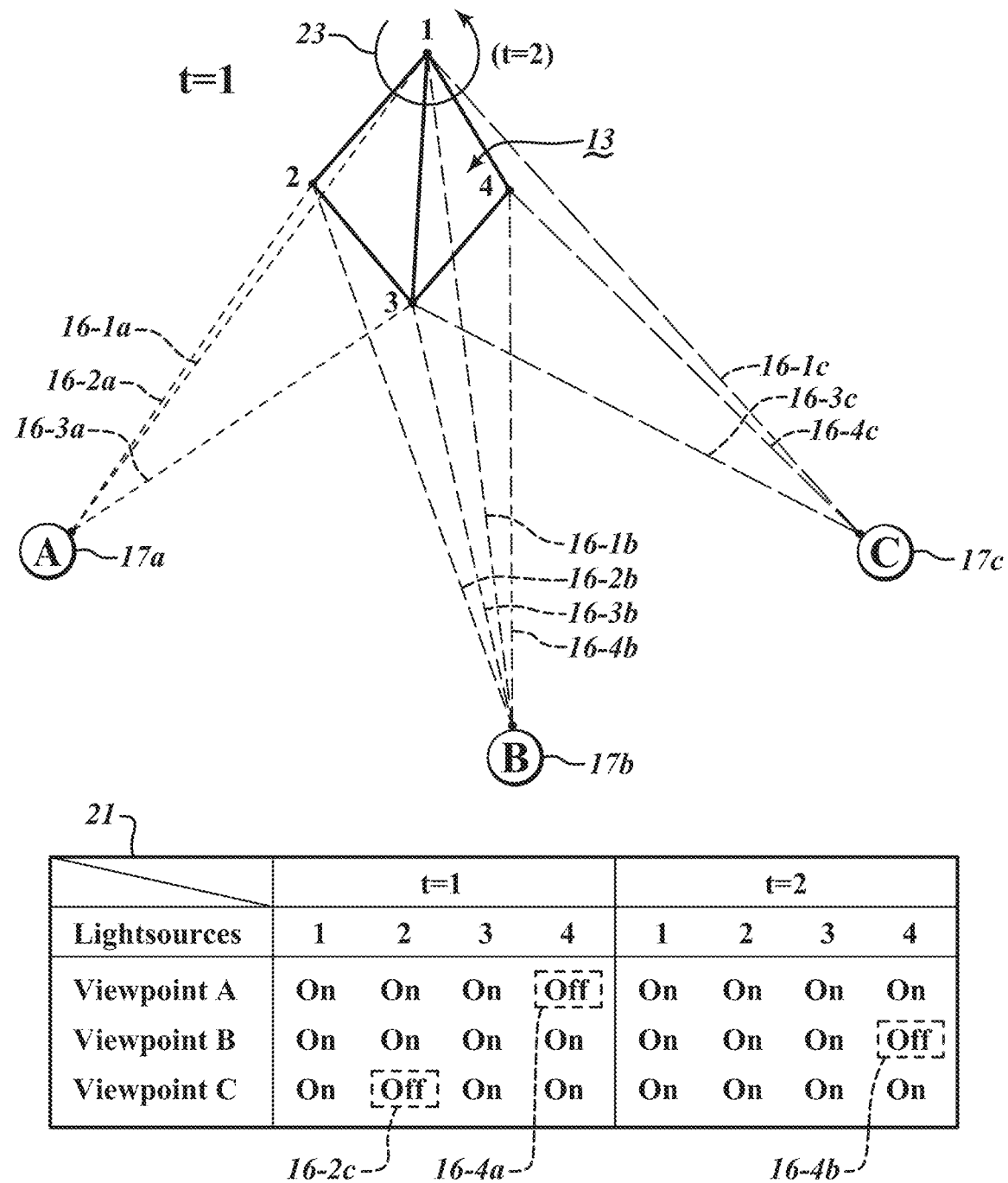
FIG. 3B schematically illustrates an overall configuration example of an aerial light show system including aerial vehicles placed at vertices of a tetrahedron (triangular pyramid) object, each including a light source configured to project three light beams in three specified directions toward three viewpoints, respectively, such that the object is observable with proper occlusions from a unique perspective at each viewpoint.

FIG. 3B schematically illustrates an overall configuration example of an aerial light show system including aerial vehicles placed at vertices 1, 2, 3, and 4 of a tetrahedron (triangular pyramid) object 13. Each aerial vehicle includes a light source configured to project, in the illustrated example, three light beams in three specified (different) directions toward three viewpoints A, B and C, denoted as 17a, 17b and 17c, respectively. FIG. 3B illustrates that the tetrahedron object 13 is observable with proper occlusions from a unique perspective at each viewpoint A, B or C. From viewpoint A, vertices 1, 2 and 3 are observable while vertex 4 is hidden behind the tetrahedron object 13 itself and thus is not observable. Thus, while light beams 16-1a, 16-2a and 16-3a emitted from the aerial vehicles at vertices 1, 2 and 3 are turned "On" to be visible from viewpoint A, a light beam 16-4a from the aerial vehicle at vertex 4 directed toward viewpoint A is turned "Off" and not observable. This is summarized in a table 21 in FIG. 3B, at time t=1. From viewpoint B, all vertices 1, 2, 3 and 4 are observable. Thus, all light beams 16-1b, 16-2b, 16-3b and 16-4b emitted from the aerial vehicles at vertices 1, 2, 3 and 4 are turned "On" to be visible from viewpoint B, as also summarized in the table 21. From viewpoint C, vertices 1, 3 and 4 are observable while vertex 2 is hidden behind the tetrahedron object 13 itself and thus is not observable. Thus, while light beams 16-1c, 16-3c and 16-4c emitted from the aerial vehicles at vertices 1, 3 and 4 are turned "On" to be visible from viewpoint C, a light beam 16-2c from the aerial vehicle at vertex 2 directed toward viewpoint C is turned "Off" and not observable, as also summarized in table 21.

Figure 3C:
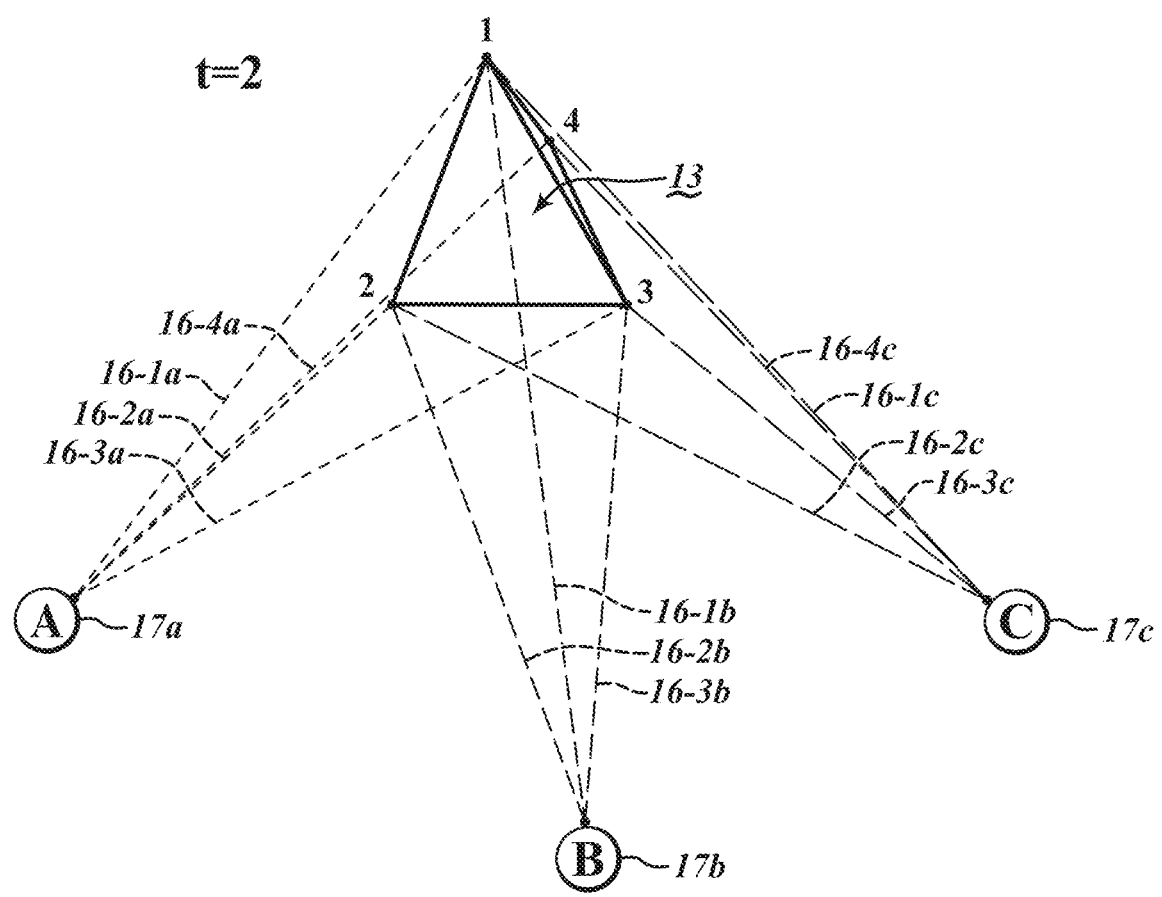
FIG. 3C schematically illustrates the aerial light show system of FIG. 3B, after the tetrahedron object has been rotated such that different views of the light show are observable from the three viewpoints compared to FIG. 3B.
Figure 4A:
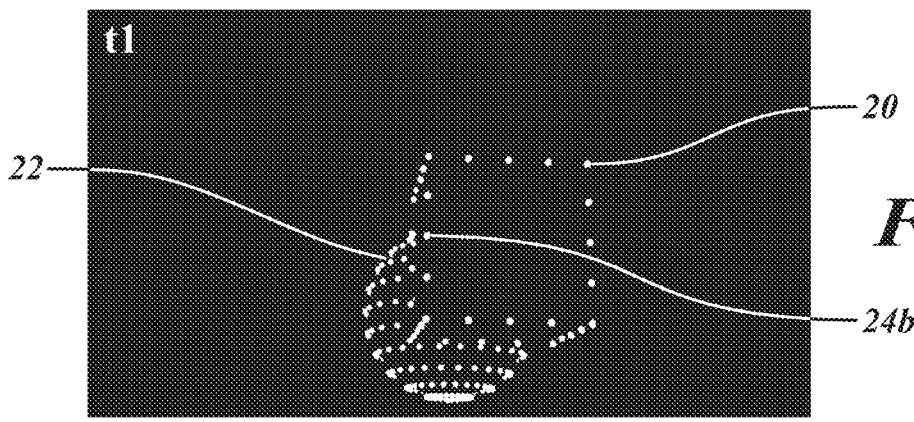
FIGS. 4A-4G illustrate a time series of views from one viewpoint of an aerial light show of a virtual 3D scene of a cube and a sphere rotating relative to each other, which is achievable according to the present invention.
Figure 4B:
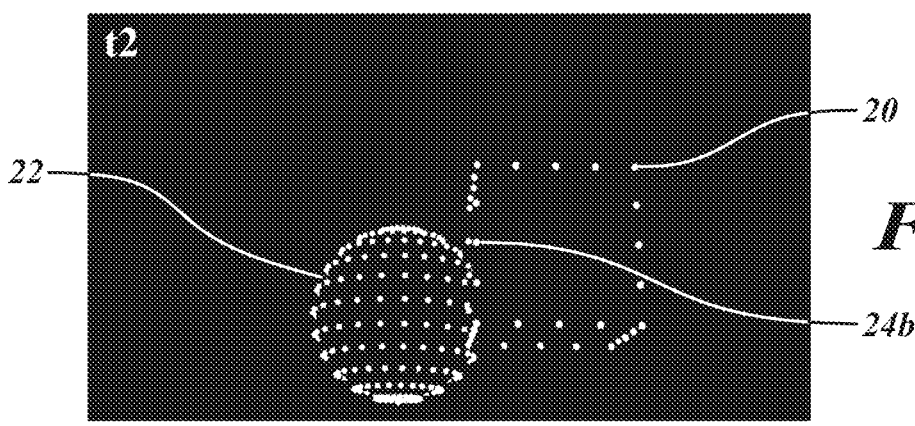
Figure 4C:
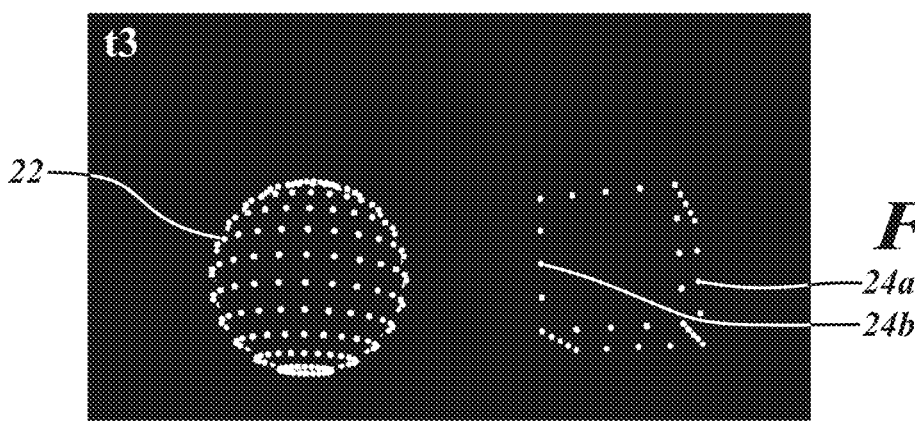
Figure 4D:
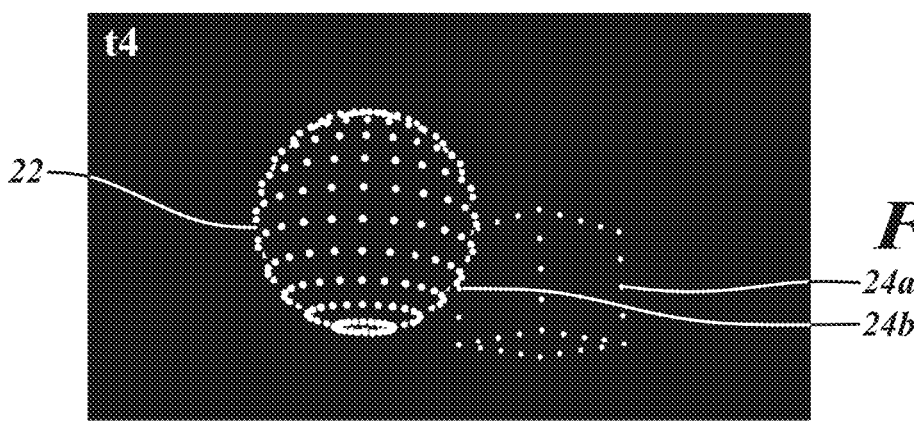
Figure 4E:
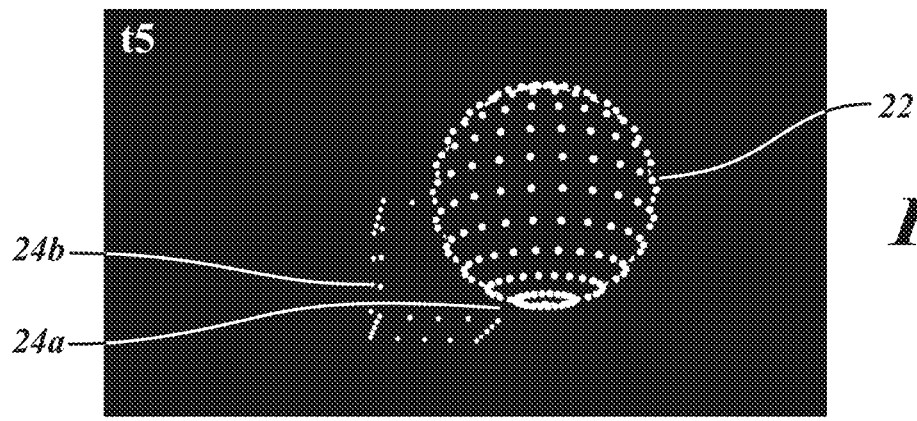
Figure 4F:
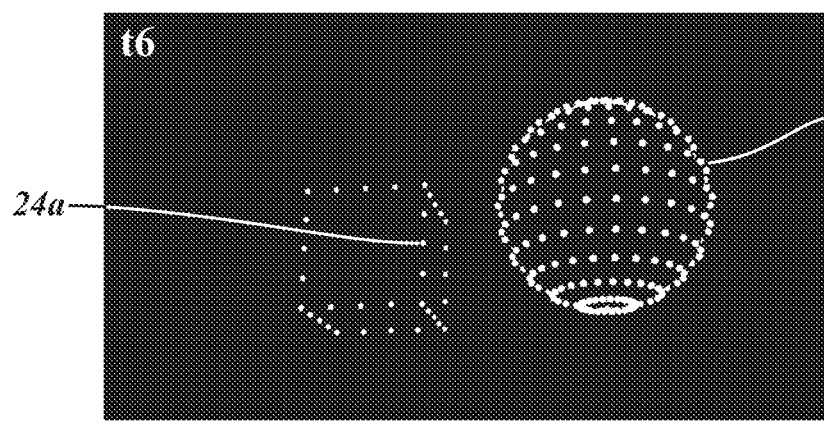
Figure 4G:
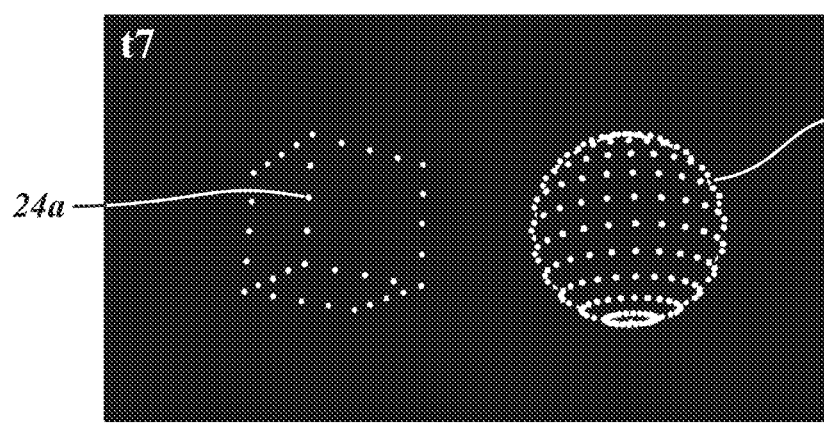

Assume that in the aerial light show the tetrahedron object 13 is rotated, as indicated by an arrow 23, at time t=2. FIG. 3C schematically illustrates the same aerial light show system of FIG. 3B, but after the tetrahedron object 13 has been rotated such that now (at time t=2) different views of the light show are presented to the three viewpoints, as compared to FIG. 3B. At time t=2, from viewpoint A, all vertices 1, 2, 3 and 4 are observable and, thus, all light beams 16-1a, 16-2a, 16-3a and 16-4a emitted from the aerial vehicles at vertices 1, 2, 3 and 4 are turned "On" to be visible from viewpoint A, as summarized in table 21 in FIG. 3B. From viewpoint B, vertices 1, 2 and 3 are observable while vertex 4 is hidden behind the tetrahedron object 13 itself and thus is not observable. Thus, while light beams 16-1b, 16-2b and 16-3b emitted from the aerial vehicles at vertices 1, 2 and 3 are turned "On" to be visible from viewpoint B, a light beam 16-4b from the aerial vehicle at vertex 4 directed toward viewpoint B is turned "Off" and not observable. This is summarized in table 21 in FIG. 3B, at time t=2. From viewpoint C, all vertices 1, 2, 3 and 4 are observable. Thus, all light beams 16-1c, 16-2c, 16-3c and 16-4c emitted from the aerial vehicles at vertices 1, 2, 3 and 4 are turned "On" to be visible from viewpoint C, as also summarized in the table 21.

As shown in FIGS. 3B and 3C, the light show system according to various embodiments allows for the light sources of different aerial vehicles to project light beams at different angles to a particular viewpoint, to thereby present a unique view of the light show to an observer at the viewpoint. Different views of the light show may be observed from different viewpoints A, B and C, respectively, at the same time. Because occluded light beams are selectively turned "Off" according to a particular perspective of each viewpoint relative to the virtual 3D scene, the object in the virtual 3D scene is observable with proper occlusions from any one of the different viewpoints.

FIGS. 4A-4G illustrate a time series of views from one viewpoint of an aerial light show of a virtual 3D scene of a cube 20 and a sphere 22 rotating relative to each other, which is achievable using the aerial light show system 10 of the present invention. As shown in FIGS. 4A-4G taken at time-stamps t1 through t7, only those light beams emitted in the specified direction toward the viewpoint and unoccluded by the virtual 3D scene are not modified and visible to a viewer at the viewpoint. On the other hand, those light beams emitted in the specified direction toward the viewpoint and occluded by the virtual 3D scene are modified, for example, with their brightness dimmed and/or color faded or even completely turned off, as in the example of FIGS. 4A-4G. Thus, when the cube 20 is in front of the sphere 22 as viewed from the viewpoint as in FIGS. 4A and 4B at time t1 and t2, the light beams from the aerial vehicles 12 forming the sphere 22 that are blocked by the cube 20 may be turned off. Similarly, when the sphere 22 is in front of the cube 20 as viewed from the viewpoint as in FIGS. 4D and 4E at time t4 and t5, the light beams from the aerial vehicles 12 forming the cube 20 that are blocked by the sphere 22 may be turned off.

Figure 1:
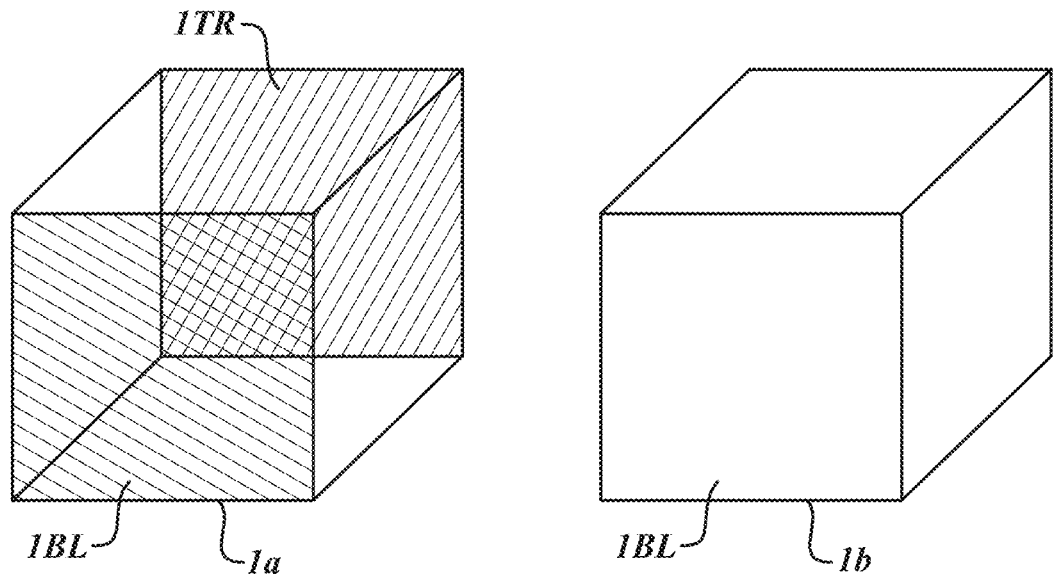
FIG. 1 illustrates a problem of ambiguity in interpreting a 3D cube rendered on a 2D surface.
Figure 2:
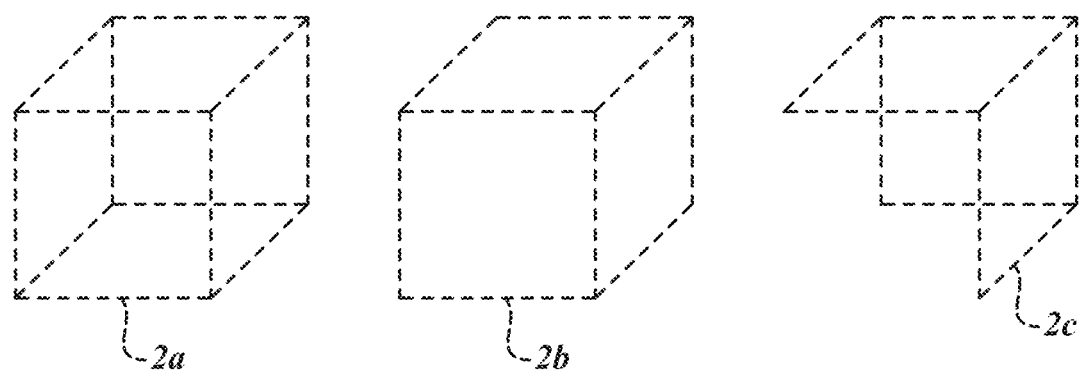
FIG. 2 illustrates a problem of ambiguity in interpreting a 3D cube depicted with drone lights in a 3D space.

Further, considering the cube 20 alone, only those light beams emitted in the specified direction toward the viewpoint and unoccluded by the cube 20 itself are not modified and visible at the viewpoint. On the other hand, those light beams emitted in the specified direction toward the viewpoint and occluded by the cube 20 itself are modified, for example, with their brightness dimmed and/or color faded or even completely turned off. Thus, the light beams from the aerial vehicles forming the edges of the cube 20 that are blocked by the cube 20 itself may be turned off, such that only those light beams from the aerial vehicles forming the edges of the cube 20 that are unoccluded are visible at the viewpoint. This results in realistic rendering of the rotating cube 20 which continuously changes its angle from time t1 in FIG. 4A through time 17 in FIG. 4G. For example, an edge 24a visible from time t3 through t7 in FIGS. 4C through 4G has been not visible (e.g., the light beams emitted in the specified direction toward the viewpoint from the aerial vehicles 12 forming the edge 24a are turned off) at time t1 and t2 in FIGS. 4A and 4B before the cube 20 has rotated such that the edge 24a becomes visible at time t3. Similarly, an edge 24b visible from time t1 through t5 in FIGS. 4A-4E is "turned off" at time t6 in FIG. 4F when the cube 20 has rotated such that the edge 24b is occluded behind the cube 20 itself. Thus, the aerial light show system 10 of the present invention does not suffer from ambiguity problems in the prior art as discussed above in reference to FIG. 2 (see the cube 2c). According to the aerial light show system 10 of the present invention, the viewer can enjoy a clear and unambiguous aerial light show of the virtual 3D scene involving the rotating cube 20 and sphere 22 regardless of a particular viewpoint (vantage point) of the viewer within the viewing area 19.

FIGS. 5A-5J illustrate another example time series, at time-stamps t1 through t10, of views from one viewpoint of an aerial light show of a virtual 3D scene of a witch 26 flying through a cube 20 and two spheres 22a and 22b, achievable with the aerial light show system 10 of the present invention. As illustrated, the cube 20 and spheres 22a and 22b are illuminated by placing light sources (of aerial vehicles) on their surfaces. The witch 26, on the other hand, is not illuminated and its presence in the virtual 3D scene is only revealed by the occlusions it creates.

Figure 5A:
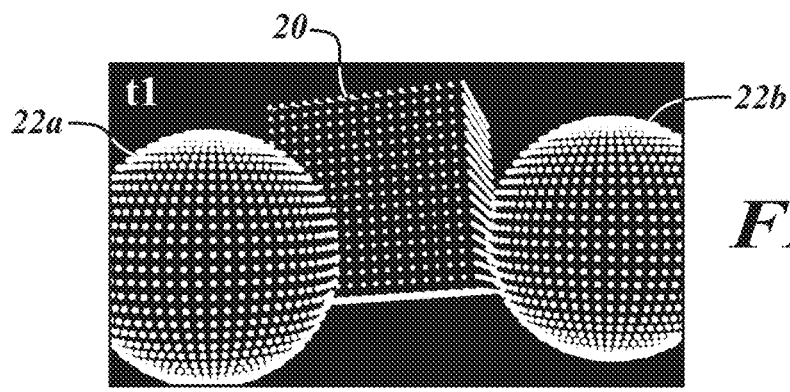
FIGS. 5A-5J illustrate a time series of views from one viewpoint of an aerial light show of a virtual 3D scene of a witch flying through a cube and two spheres, which is achievable according to the present invention.
Figure 5B:
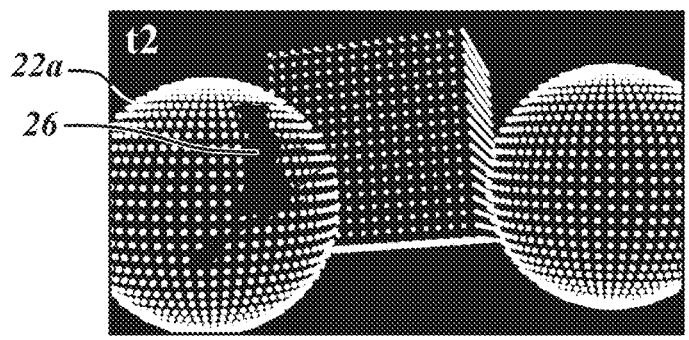

As shown, only those light beams emitted in the specified direction toward the viewpoint and unoccluded by the virtual 3D scene are not modified and visible to a viewer at the viewpoint. On the other hand, those light beams emitted in the specified direction toward the viewpoint and occluded by the virtual 3D scene are modified, for example, with their brightness dimmed and/or color faded or even completely turned off, as in the example of FIGS. 5A-5J. In FIG. 5A, the cube 20 is generally behind the two spheres 22a and 22b as viewed from the viewpoint, and thus the light beams emitted in the specified direction toward the viewpoint from the aerial vehicles 12 forming the cube 20 that are blocked by the two spheres 22a and 22b may be turned off. In FIG. 5B, the flying witch 26 enters the virtual 3D scene, in front of the first sphere 22a. The witch 26 is presented as a shadow object where no light beams are visible from the viewpoint. Thus, the light beams emitted in the specified direction toward the viewpoint from the aerial vehicles 12 forming the first sphere 22a that are blocked by the witch 26 may be turned off to thereby render the shadow object (or negative image) of the witch 26 in front of the first sphere 22a.

Figure 5C:
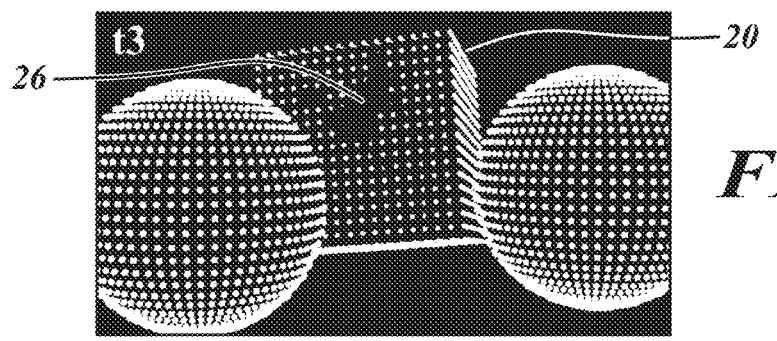
Figure 5D:
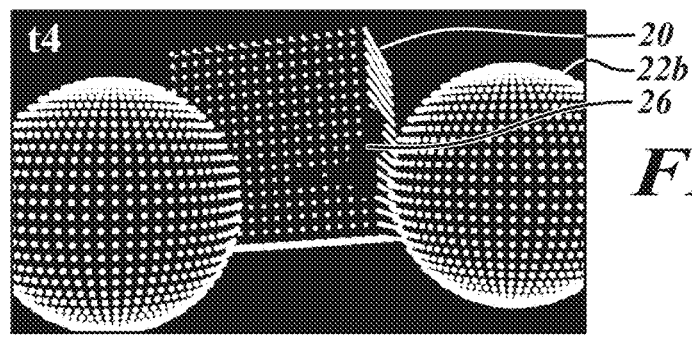
Figure 5E:
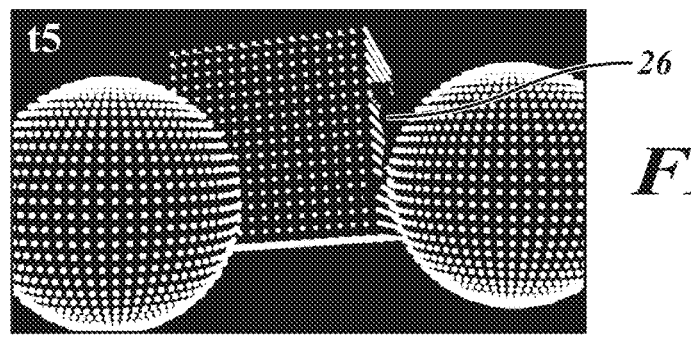
Figure 5F:
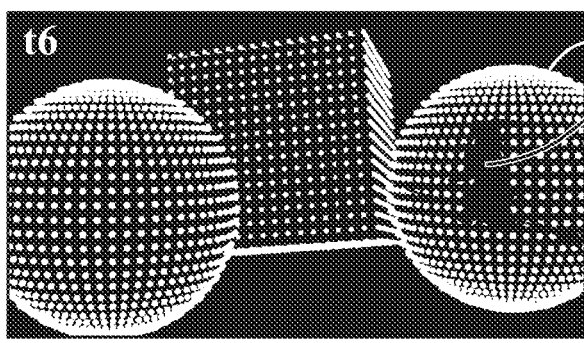
Figure 5G:
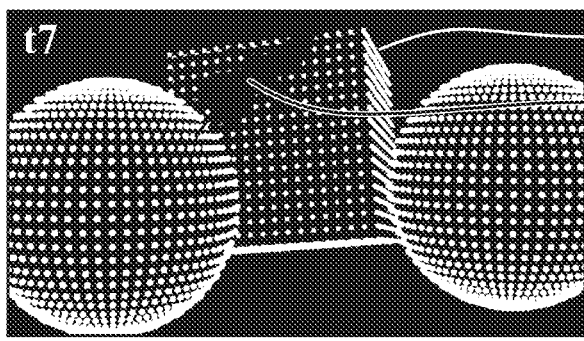
Figure 5H:
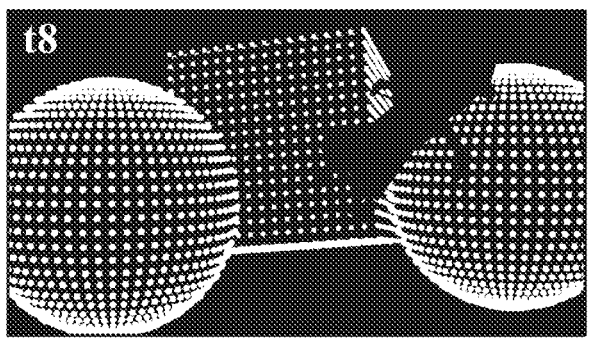
Figure 5I:
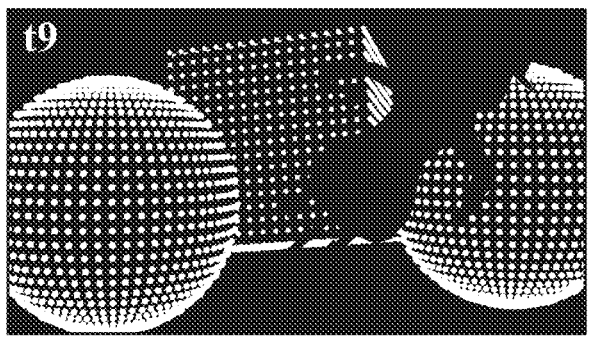
Figure 5J:
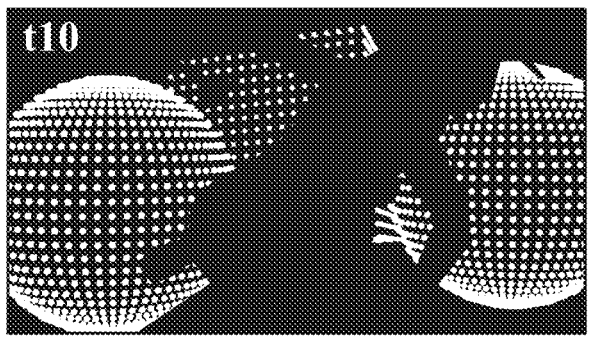
Figure 6A:
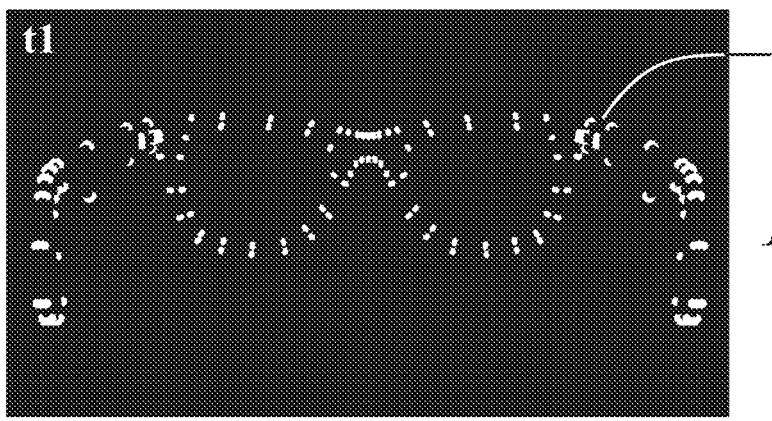
Figure 6B:
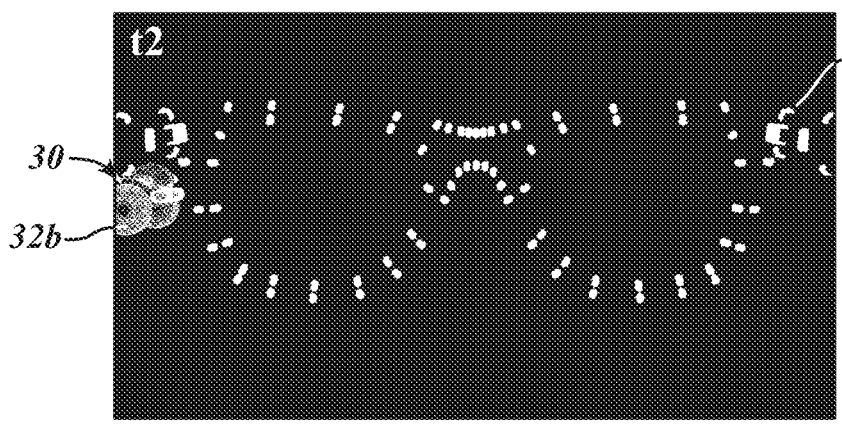
Figure 6C:
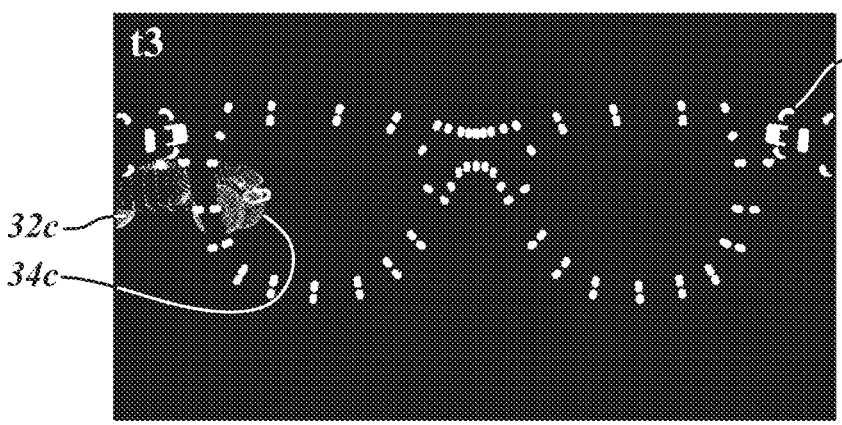
Figure 6D:
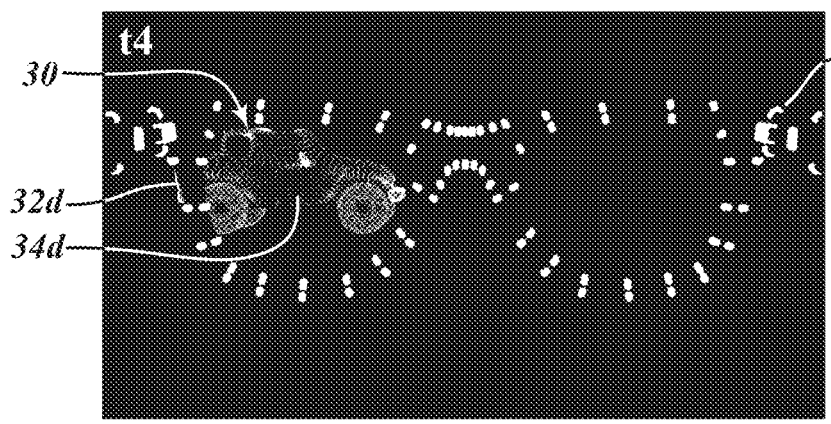

In FIG. 5C, the flying witch 26 has moved to be now in front of the cube 20. Thus, the light beams emitted in the specified direction toward the viewpoint from the aerial vehicles 12 forming the cube 20 that are blocked by the witch 26 may be turned off to thereby render the shadow object of the witch 26 in front of the cube 20. In FIGS. 5D and 5E, the witch 26 flies in between the cube 20 and the second sphere 22b. Thus, the light beams emitted in the specified direction toward the viewpoint from the aerial vehicles 12 forming the cube 20 that are blocked by the flying witch 26 may be turned off, in addition to those light beams from the cube 20 that are blocked by the second sphere 22b and thus are turned off. On the other hand, the light beams emitted in the specified direction toward the viewpoint from the aerial vehicles 12 forming the second sphere 22b in front of the flying witch 26 are not modified and not turned off. As a result, a realistic and unambiguous 3D rendering of the witch 26 flying between the cube 20 and the second sphere 22b, that is, in front of the cube 20 and behind the second sphere 22b, is created in the sky. In FIG. 5F, the witch 26 has flown around the second sphere 22b to be now in front of the second sphere 22b. Thus, the light beams emitted in the specified direction toward the viewpoint from the aerial vehicles 12 forming the second sphere 22b that are blocked by the witch 26 may be turned off to thereby render the shadow object of the witch 26 in front of the second sphere 22b. In FIGS. 5G-5J, the witch 26 generally in front of the cube 20 moves toward the viewpoint and thus grows in size from time t7 in FIG. 5G through time t10 in FIG. 5J. Note here that FIGS. 5A-5J are views of the aerial light show from just one viewpoint. The aerial light show of the witch 26 flying between the cube 20 and spheres 22a and 22b is presented correctly, by removing occluded beams, to all viewpoints within the viewing area 19 simultaneously. Thus, while the witch 26 appears flying toward a viewer at the viewpoint of FIGS. 5G-5J, the same witch 26 may appear flying from left to right from another viewpoint, or the same witch 26 may appear flying away from a viewer at yet another viewpoint. Thus, proper illusion based on removal of occluded light beams may be created for all viewpoints simultaneously. That is, from a unique perspective of each viewpoint, any light beams occluded by the virtual 3D scene are modified (e.g., turned off) so as to create a proper illusion toward the viewpoint, and this process is performed for each of all viewpoints so as to create proper but different illusions at different viewpoints, simultaneously.

FIGS. 6A-6G illustrate a time series of views from one viewpoint of an aerial light show of a virtual 3D scene of sunglasses 28, through which a moving truck 30 is visible, which is achievable using the aerial light show system 10 of the present invention. As shown in FIGS. 6A-6G taken at time-stamps t1 through t7, since the sunglasses 28 are generally in front of (and closer to the viewpoint than) the moving truck 30, those light beams emitted in the specified direction toward the viewpoint from the aerial vehicles 12 forming the sunglasses 28 are unoccluded and thus are not modified and remain visible. On the other hand, since the moving truck 30 is behind the sunglasses 28, only those light beams emitted in the specified direction toward the viewpoint from the aerial vehicles 12 forming the truck 30 that are unoccluded (by the sunglasses 28 and by the moving truck 30 itself) are not modified and visible in the original brightness and/or color, as shown in portions 32b-32g of the truck 30 in FIGS. 6B-6G. Those light beams emitted in the specified direction toward the viewpoint from the aerial vehicles 12 forming the truck 30 moving behind the sunglasses 28 and occluded by the sunglasses 28 are modified, for example, with their brightness dimmed and/or color changed, to thereby enable a transparency effect, as in the example of FIGS. 6A-6G, to mimic viewing through sunglasses. This is illustrated in portions 34c-34g of the moving truck 30, visible with modified brightness and/or color through the sunglasses 30, in FIGS. 6C-6G. According to the aerial light show system 10 of the present invention, the viewer can enjoy a clear and unambiguous aerial light show of the virtual 3D scene of the moving truck 30 observed through the sunglasses 28.

Figure 7:
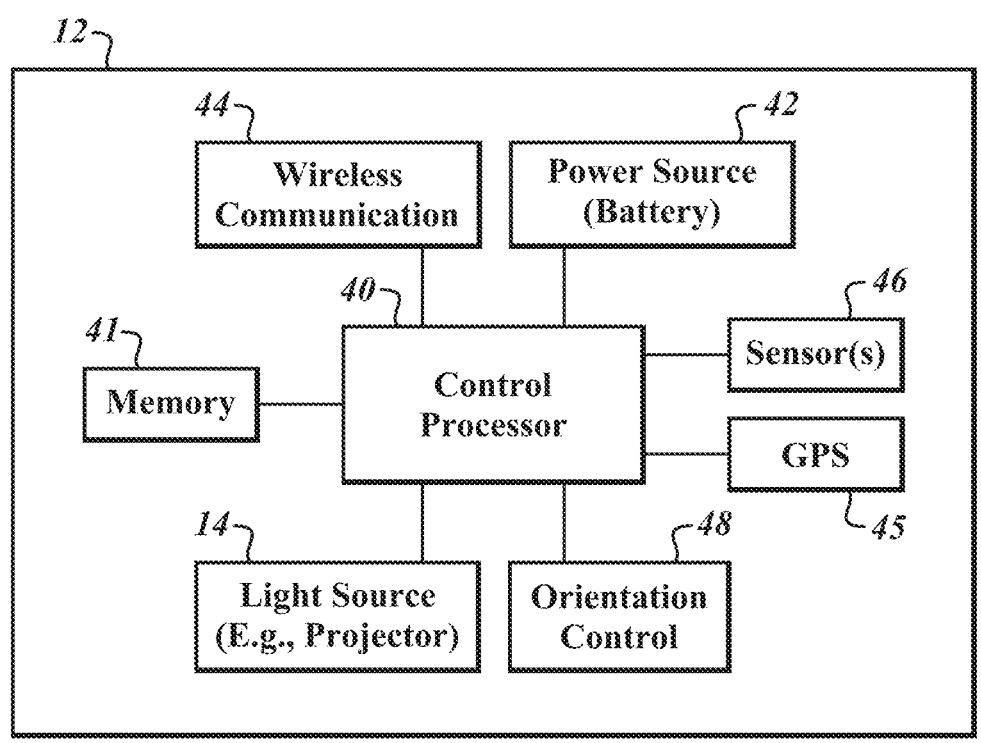
FIG. 7 is a functional diagram of an example of an aerial vehicle usable in the aerial light show system according to the present invention.

FIG. 7 is a functional diagram of an example of an aerial vehicle 12 usable in the aerial light show system 10. The aerial vehicle 12 may include a control processor 40, a memory device 41, a power source 42 such as a battery, a wireless communication module 44 for communicating with an external controller which may form the control system 18 (see FIG. 3A), a GPS module 45, one or more sensors 46, an orientation control 48 including a steering mechanism for example, and the light source 14.

The control processor 40 may be embodied as a signal processing electronic circuit in integrated circuit (IC) chip(s) configured to execute instructions stored in the memory device 41 and/or received via the wireless communication module 44 from the external controller to carry out a method for an aerial light show. In an exemplary embodiment, the control processors 40 of the aerial vehicles 12 together with the external controller collectively form the control system 18 of the aerial light show system 10, and various functions, routines and processing of a method for an aerial light show may be distributedly carried out within the control system 18 in any suitable manner according to each implementation. The one or more sensors 46 may include, for example, an orientation sensor or an altimeter, and together with the GPS module 45 may provide the control processor 14 with accurate position and orientation information of the light source 14. The control processor 14 may use the information to confirm or adjust the position and orientation of the light source 14, using the orientation control 48 including a steering mechanism for example, so that the multiple light beams 16a-16x from the light source 14 are projected in the multiple specified (intended) directions, respectively.

In various embodiments, the orientation sensor may include a 9-degree of freedom inertial measure unit that measures acceleration via a 3-axis accelerometer, rotation via a 3-axis gyroscope, and magnetic field via a 3-axis magnetometer. The altimeter may be added for a tenth axis. GPS-based systems are generally used for position. In some embodiments, multiple on-board GPS units may be provided to establish orientation as well as position. Other navigation systems may also be used such as ground RF-based systems having GPS-equivalent functionality based on transmitters (or receivers) on the ground.

Figure 8A:
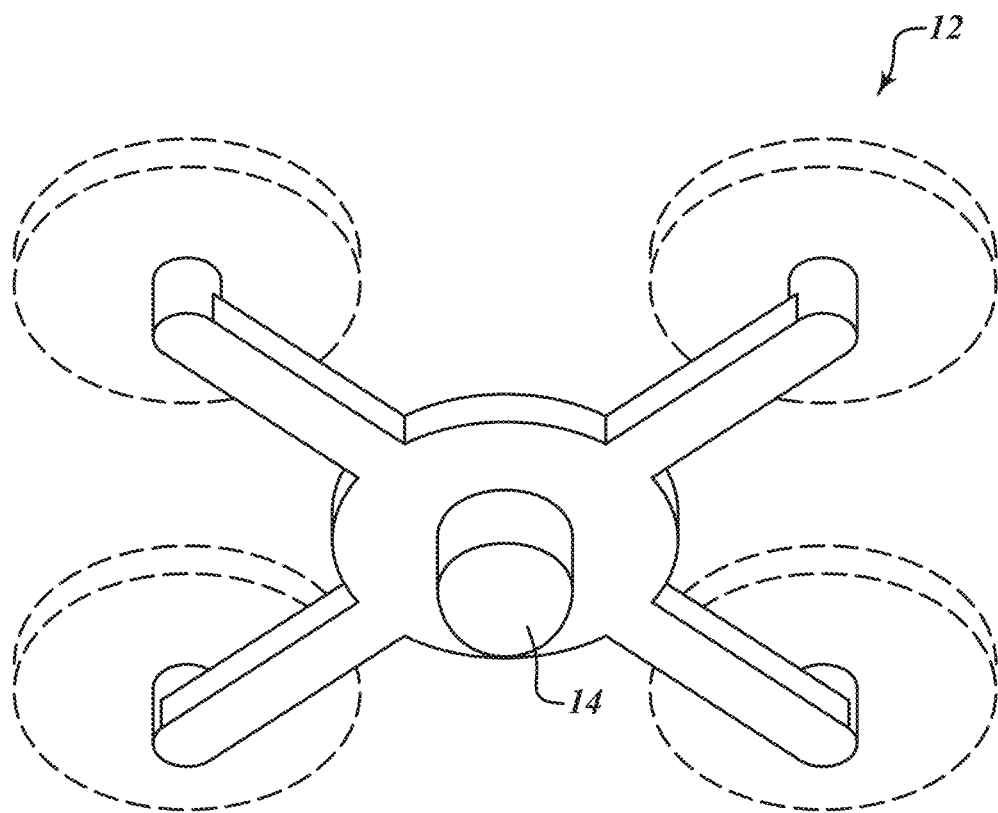
FIGS. 8A-8C each illustrates an example of an aerial vehicle usable in the aerial light show system according to the present invention.
Figure 8B:
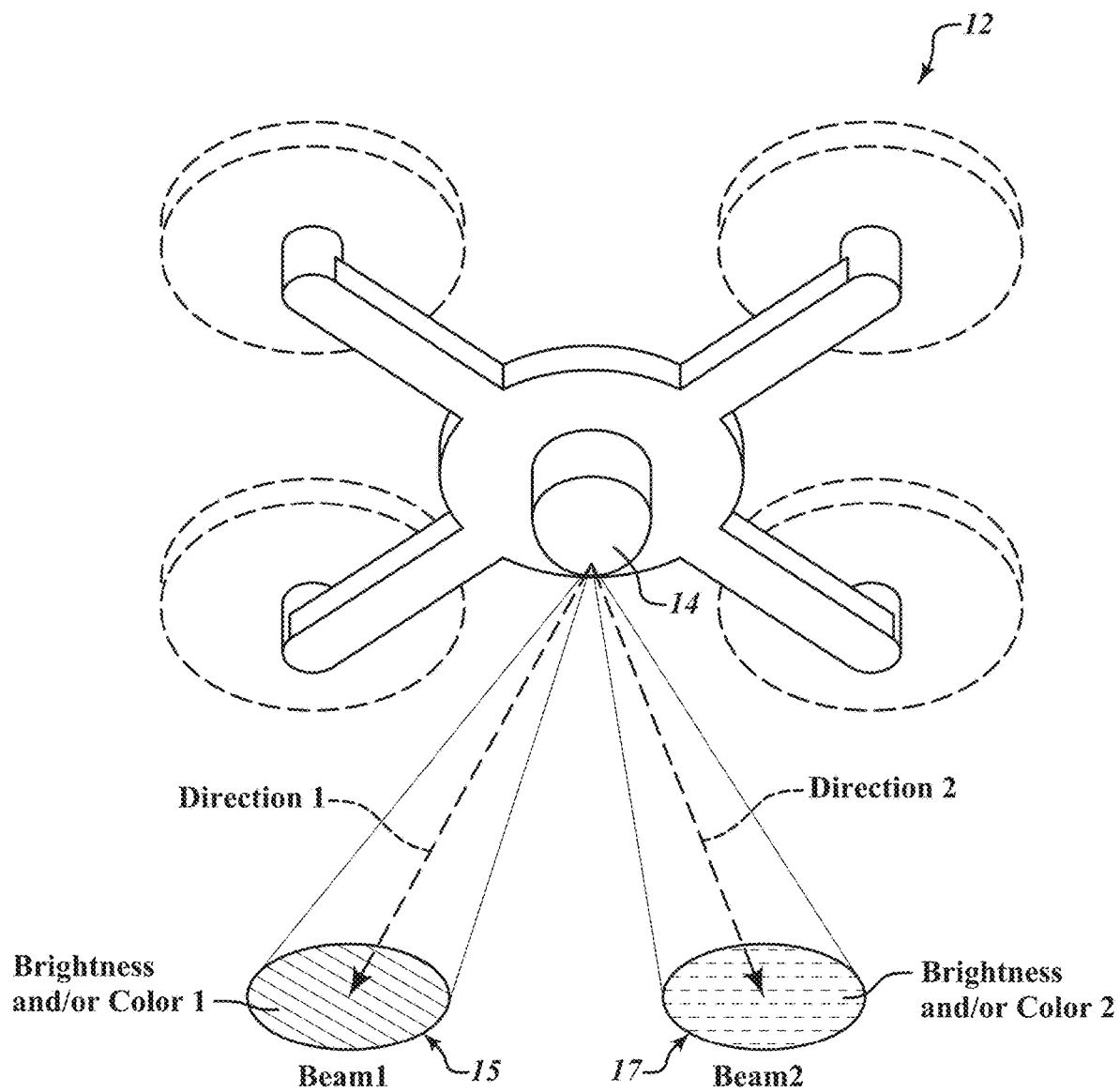
Figure 8C:
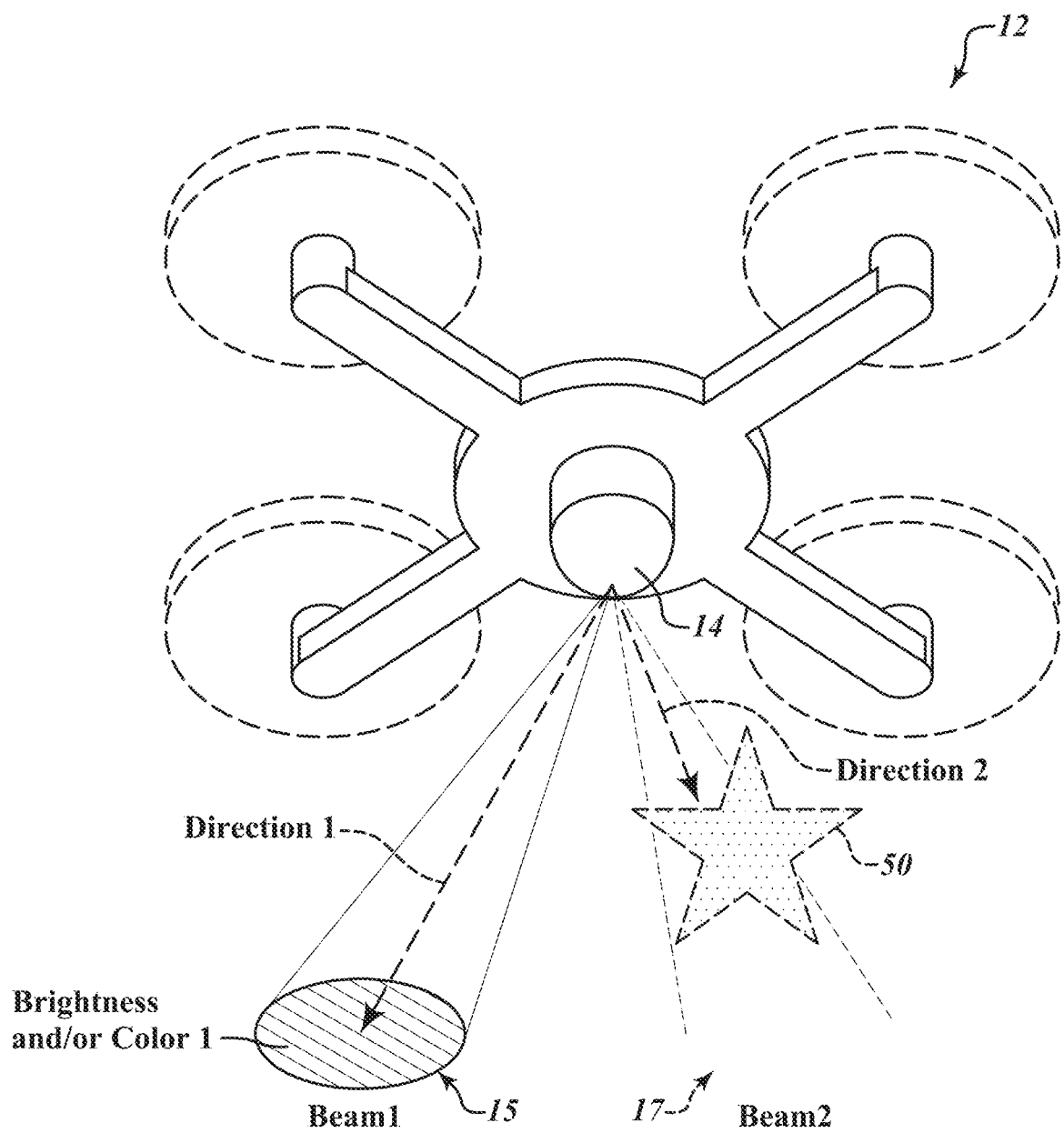

FIGS. 8A-8C each illustrates an example of an aerial vehicle 12 usable in the aerial light show system 10 according to the present invention. FIG. 8A illustrate an aerial vehicle 12 in the form of a quadcopter, on which a light source 14 in the form of a projector is mounted. As shown in FIG. 8B, the light source (projector) 14 is configured to project multiple beams, Beam 1 and Beam 2, in multiple specified directions, Direction 1 and Direction 2, respectively. The brightness and/or color of each of the multiple light beams is independently controllable. Specifically, Brightness and/or Color 1 of Beam 1 is independently controllable, and so is Brightness and/or Color 2 of Beam 2, as illustrated. FIG. 8C illustrates the concept of occlusion and non-occlusion. Specifically, Beam 1 projected in Direction 1 is unoccluded and, thus, its Brightness and/or Color 1 is not modified. Thus, a viewer at a viewpoint 15 in Direction 1 can observe Beam 1 in its original (unmodified) Brightness and/or Color 1. The viewer at the viewpoint 15 does not see Beam 2 because the viewer is not at a viewpoint 17 in Direction 2 to observe Beam 2.

On the other hand, Beam 2 projected in Direction 2 is occluded by a virtual object 50 which forms the virtual 3D scene being rendered in an aerial light show. Thus, Brightness and/or Color 2 of Beam 2 is modified, for example turned off as in the illustrated example of FIG. 8C, wherein the virtual object 50 is opaque, such that a viewer at the viewpoint 17 in Direction 2 does not observe Beam 2 at all. If Brightness and/or Color 2 is modified with the brightness dimmed and/or the color changed or dimmed, for example, then the viewer at the viewpoint 17 in Direction 2 may observe Beam 2 but with the modified brightness and/or color.

Thus, from one viewpoint 15, the aerial vehicle 12 can appear lit, while at another viewpoint 17, it can appear to be occluded. If the occluding 3D object is only partially opaque, the brightness and/or color of Beam 2 can be dimmed to depict transparency, for example. It should be noted that the occluding virtual 3D object may or may not have its own aerial light sources assigned to it. An occluding virtual 3D object can be unlit, but still perceived by viewers purely by the occlusions it creates to block light from illuminated virtual objects behind it. This is embodied in the unlit witch 26 which is visible when flying in front of the lit cube 20 and the lit spheres 22a and 22b, as shown in FIGS. 5A-5J.

It should be noted that, in contrast to the common use of projectors for projecting images on a screen to be viewed as an image, the projector used as a light source 14 on an aerial vehicle 12 does not present an image to viewers on the ground. Looking up at a projector from the ground, the viewer sees a single spot of light. In various embodiments, the brightness and/or color of the spot depends only on the light beam that is directed at the viewer. To make an image on a very large scale in the sky, many aerial vehicles 12 with projectors used as light sources 14 are utilized with each projector adding one spot of light to the overall image visible to the viewer.

During an aerial light show, aerial vehicles 12 are positioned to light key points on the intended 3D scene. This is often done by lighting along edges or over surfaces of 3D figures modelled in the 3D scene. In the prior art systems, all aerial lights are visible over the show area. This makes it impossible to selectively block light that should have been occluded by the 3D model when observed from different viewpoints.

According to various embodiments of the present invention, there are a plurality of aerial vehicles 12, each equipped with one or more projectors (as one or more light sources 14) that emit a plurality of light beams such that beams that intersect with the 3D model are suitably modified to represent the interaction with the 3D model. The result is that any observer within the show area (viewing area 19) will perceive light from the aerial vehicles 12 in a way that accounts for occlusion and transparency irrespective of their viewpoint. The present invention offers functionality and capability to limit the extent of projection from each projector (each light source 14) to particular viewpoints (15 and 17 in FIG. 8C). This enables a variety of capabilities for the show designer. For example, some light beam directions may be associated with space no viewers are expected to ever be, such as towards the sky or in the direction of an ocean when viewers are on the beach. Limiting the show viewing area 19 has many practical advantages such as simplifying the projector used as the light source 14 and saving power (e.g., saving the battery power source 42 in the aerial vehicle 12 in FIG. 7). This functionality can also be used to restrict the viewing area 19 so the aerial light show is only visible in areas reserved for paying guests.

According to various embodiments, the aerial vehicles 12 each carry a light source 14 (e.g., a light projection system or a projector) that can be programmed to emit light of different brightness and/or color in different directions.

The aerial light projection system can be as simple as a standard projector module as is used for projecting video content. Appropriate projector technologies include Liquid Crystal on Silicon (LCOS), mirror arrays (e.g., Texas Instruments Digital Light Processing (DLP)), laser scan, Liquid Crystal Display (LCD), Organic Light Emitting Diode (OLED) array, and Light Emitting Diode (LED) array.

Certain optimizations may make a projector that is tailored to the aerial light show application desirable. For example, the aerial vehicles 12 preferably include light weight components, and battery life limitations create a strong desire for power-efficient systems.

In various exemplary embodiments, a projector as a light source 14 may be optimized for use on an aerial vehicle 12. While it may be desirable to be able to project light of different colors for the purpose of modeling interaction with a color-filtering 3D object, simple occlusion and non-color dependent transparency 3D scenes only need to light one color at a time, with different brightness levels being provided to different viewpoints. Thus, adoption of a monocolor 3D scene can simplify the design of the projection system and greatly improve power efficiency.

If a virtual 3D model does not include semitransparent sections which would change the color of the light beam, then any particular light source (e.g., projector) only needs to project one color at any moment in various embodiments. That is still true if the virtual 3D model has different color lights, with each aerial vehicle showing one color at a time. Then, the optimization here is that the projectors only need to show one, patterned color at a time.

This would simplify the projector design. For example, the projector can include a color programmable light source, which is relatively easy to configure, and a monochrome spatial light modulator (e.g. LCD, DLP, LCOS) because it does not set separate "pixel" colors. If the virtual 3D scene is a monochrome 3D scene, then it may not be necessary to include any programmable color anywhere in the system.

There are many techniques that are well known in the art for making projectors that would be suitable for use in the present invention. For ease of explanation, we consider here two categories of projectors-those that employ a spatial light modulator (e.g., LCD, LCOS, film) illuminated by a shared light source, and those that employ an array of light emitting devices (e.g., OLED, LED arrays).

In various exemplary embodiments, a spatial light modulator-based projector is employed as a light source 14 which can shine a spatially-modulated pattern of brightness of one, programmable color at a time. In the case of an LCD-based projector, a monochrome panel can be used, which avoids the use of color filters, giving a more power efficient projection. The programmable color light source can be provided by well-known methods such as red, green and blue LEDs or lasers. Such a projector can change color, turn off to model occlusion by an opaque 3D object, or dim to model different levels of transparency. It may not be able to model transparency that has spectral dependency like color filtering. If such capability is desired, a more traditional, full color projector can be employed.

Other embodiments of the projector as the light source 14 use an array of LEDs that are arranged with individual lenses and/or barriers to illuminate fixed angular extents.

Some projectors may suffer from the screen door effect, with obvious unlit areas between pixels. This could result in failing to project appropriate imagery (light beams) to some viewpoints. To prevent this, various techniques can be employed to create a more seamless projection. These include use of a diffuser on a pixelated lighting source, slight defocusing of the projection, and using the vibration of the aerial vehicle 12 to shake the emitter, temporally spreading the individual light beams 16a-16x.

A similar issue may occur when using a projector that has spatially separate sub pixels which project to distinct locations. The colors need to be combined so that each projected area can see a range of colors. This can also be accomplished using the methods described above for dealing with the screen door effect.

In a practical aerial light show system, there is no need to project light in a direction where there are no intended viewers. For example, drone shows are rarely viewed from above. Thus, in various embodiments the projection mechanism only needs to cover a limited angular extent.

Wide angle projectors, as might be needed to cover dispersed viewing areas, typically use large lenses. These might be heavy or costly for the aerial light show application. Some embodiments may use catoptrics (shaped mirrors) to form the projection image. These mirrors can be built from metalized plastics, keeping them extremely lightweight.

Figure 9A:
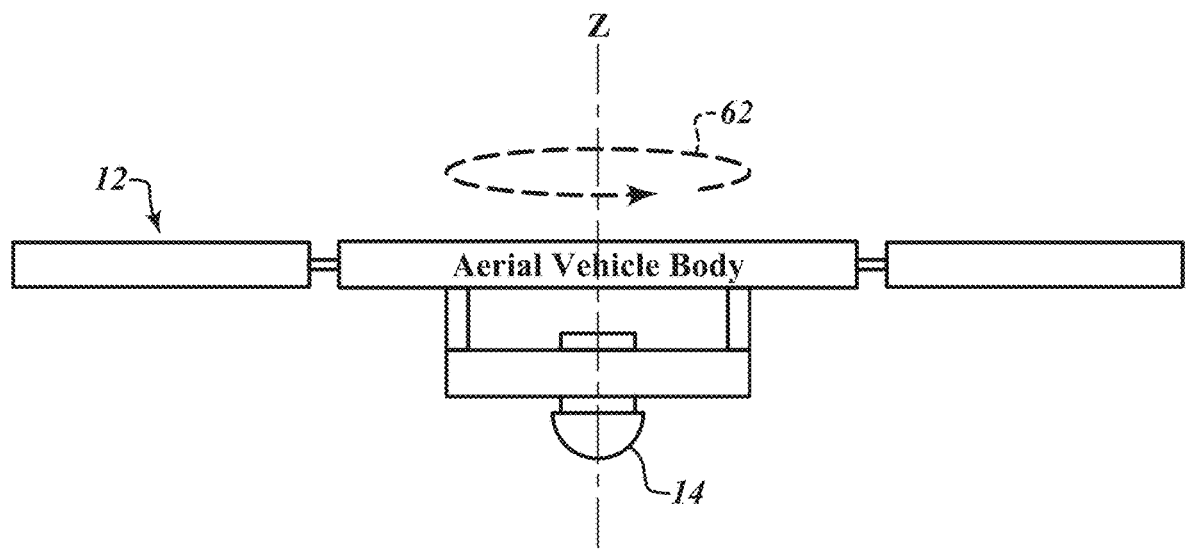
FIG. 9A is a side view of an aerial vehicle including a steering mechanism, illustrating yaw rotation control.
Figure 9B:
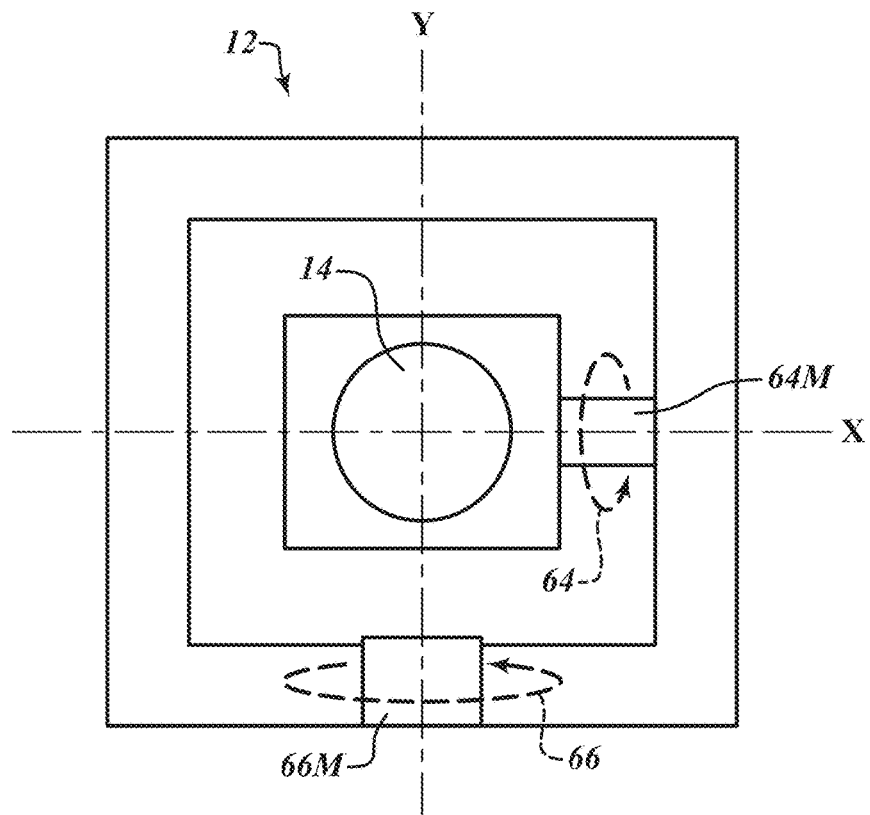
FIG. 9B is a top view of an aerial vehicle including a 2-axis steering mechanism, illustrating pitch and roll rotation control.

FIG. 9A is a side view of an aerial vehicle 12 including a steering mechanism, such as a 3-axis steering mechanism, including yaw rotation control about the Z axis. For example, the 3-axis steering mechanism of the aerial vehicle 12 may include a suitable yaw motor capable of rotating the projector 14 in a yaw rotation direction 62 about the Z axis. FIG. 9B is a top view of the aerial vehicle 12 including the 3-axis steering mechanism for example, including pitch and roll rotation control. As illustrated, the 3-axis steering mechanism of the aerial vehicle 12 may include a suitable pitch motor 64M capable of rotating the projector 14 in a pitch rotation direction 64 about the X axis, and include a suitable roll motor 66M capable of rotating the projector 14 in a roll rotation direction 66 about the Y axis. The 3-axis steering mechanism illustrated in FIGS. 9A and 9B may correspond to the orientation control 48 illustrated in FIG. 7, which is controlled by the control processor 40 based on position and/or orientation information of the projector 14 received from the GPS 45 and one or more sensor(s) 46 also illustrated in FIG. 7.

Typically, quadcopters and other hover-capable aerial vehicles 12 change their angle (pitch and roll) when they actively change their location or when trying to maintain a location when there are winds. This causes the angle of the attached light source 14 (projector) to also change. In the case of an animated display where the aerial vehicles 12 are moving, this change in angle of the attached light source 14 needs to be taken into account. The angle at each moment is directly measured by on-board sensors 46 (see FIG. 7) and the image data being projected can be appropriately transformed to account for the current orientation. Alternatively, the light source 14 can be connected to the aerial vehicle 12 via a mechanism that allows the light source 14 to remain at a fixed angle despite the motion. Such a mechanism can be a passive gimbal where the light source 14 simply points directly down due to gravity, or it can be an active mechanism as shown in FIGS. 9A and 9B where the angle of the light source 14 relative to the aerial vehicle 12 is steered in the appropriate direction through a servo mechanism. An advantage of the latter is that the angle of the projection can be adjusted dynamically so that all light sources 14 (e.g., projectors) can be pointed at the same viewing area 19 (see FIG. 3A), even though they may be widely distributed across the sky.

In some embodiments, the light source steering mechanism has one degree of freedom, allowing the pointing angle to be adjusted about the Z axis as shown in FIG. 9A. Quadcopters and similar aerial vehicles 12 can easily rotate about their Z central axis, which provides a mechanism to adjust the yaw dimension of the light source 14. Alternatively, the light source steering mechanism could incorporate rotation about the yaw axis. In some embodiments, the light source steering mechanism has two degrees of freedom, allowing the pointing angle to be adjusted about the X and Y axes as shown in FIG. 9B.

Figure 10:
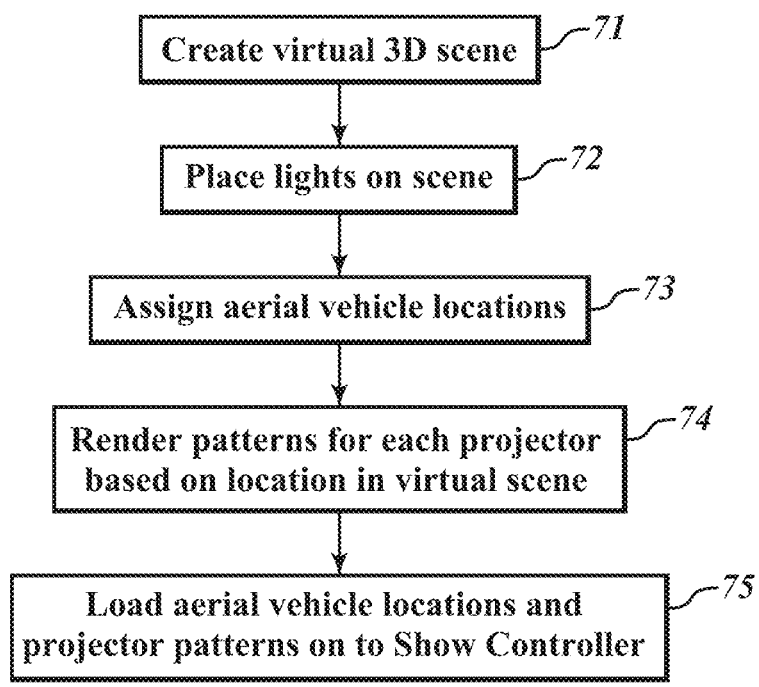
FIG. 10 is a flow chart illustrating one example of a method for an aerial light show.

FIG. 10 is a flow chart illustrating one example of a method for creating an aerial light show.

In step 71, a virtual 3D model is created in software that depicts the desired virtual 3D scene, such as the rotating sphere and cube in FIGS. 4A-4G, the witch flying between the cube and spheres in FIGS. 5A-5J, or the moving truck observed through sunglasses in FIGS. 6A-6G.

In step 72, lights are placed on the virtual 3D scene. For example, lights are placed on corners, edges, outlines, curved surfaces, etc. of each 3D object in the virtual 3D scene so as to realistically represent the virtual 3D scene.

In step 73, paths consisting of multiple positions to be traveled by aerial vehicles 12 are assigned, wherein the aerial vehicles 12 respectively include light sources 14 which correspond to the lights placed on the virtual 3D scene in step 72 above. The light source 14 of each aerial vehicle 12 is configured to project multiple light beams 16a-16x in multiple specified directions, respectively, and the brightness and/or color of each of the multiple light beams 16a-16x is independently controllable. In general, the aerial vehicles 12 will attempt to create a version of the virtual 3D scene in the sky by shining light from the multiple positions along their paths, typically on the surface of the 3D model.

Figure 11:
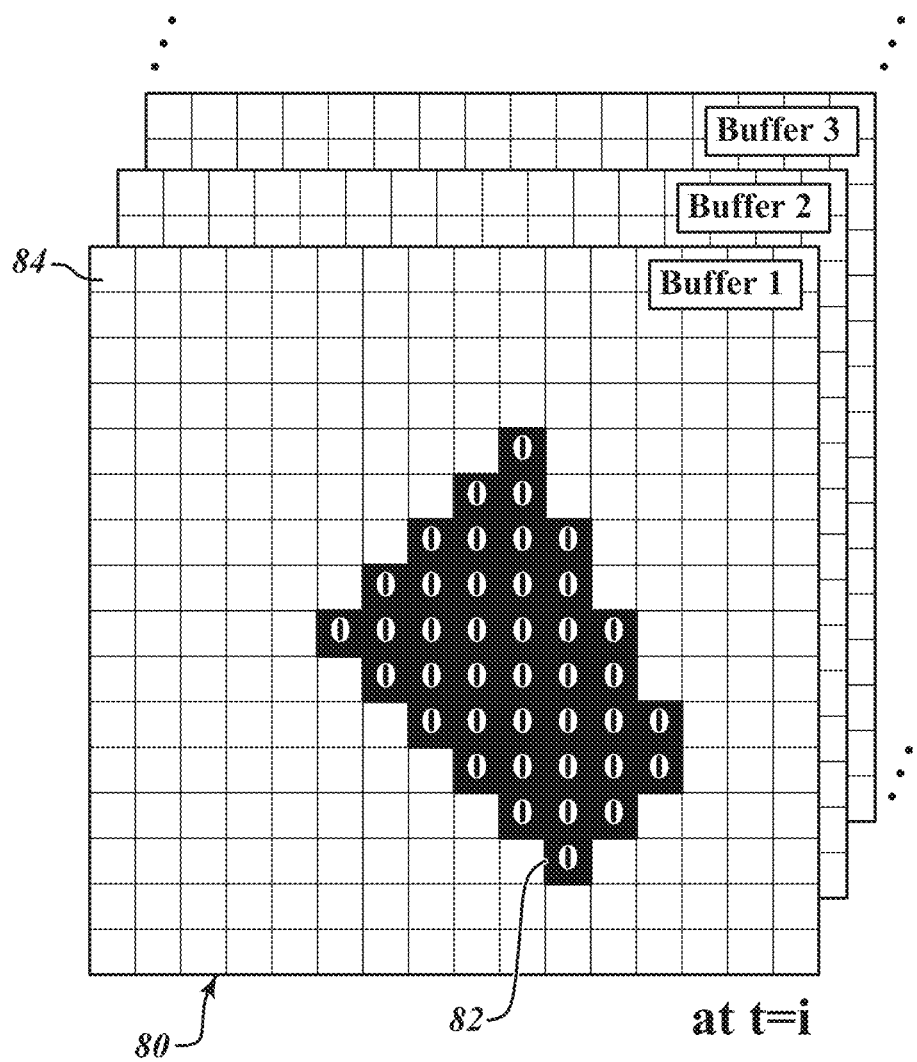
FIG. 11 illustrates a sample buffer used to compute a light pattern of the brightness and/or color of each of multiple light beams of a light source projected in multiple directions, respectively.

In step 74, for each aerial vehicle 12 and for each of at least one of the multiple positions of the path traveled by the aerial vehicle 12, a pattern 80 (see FIG. 11) of the brightness and/or color of the multiple light beams of the light source of the aerial vehicle is rendered (computed), wherein the brightness and/or color of a light beam projected in a specified direction that is occluded by the virtual 3D scene is modified (as in a portion 82), and the brightness and/or color of a light beam projected in a specified direction that is not occluded by the virtual 3D scene is not modified. In FIG. 11, the pattern 80 indicates the brightness and/or color of each of 16×16 (=256) light beams projected in 256 specified directions from the light source 14 of an aerial vehicle 12 at a given position, e.g., at a corresponding time t=i. The pattern 80 includes the portion 82 indicating forty (40) light beams which are occluded by the virtual 3D scene and thus are modified, for example turned off to be "0" as illustrated. As a result, the pattern 80 is used to control the light source 14 to project 216 (=256-40) light beams, which are not modified, in 216 specified directions, respectively, while the forty (40) light beams in the portion 82 are turned off. Methods and techniques for generating the light patterns 80 will be more fully described below in reference to FIGS. 11 and 12. It should be noted that patterns are computed in this manner for each of the aerial vehicles so this step is repeated for each aerial vehicle. As will be described below, the patterns can be rendered using a rays-first approach, an objects-first approach, or a combination of approaches.

In step 75, the paths of the aerial vehicles assigned in step 73 and the patterns rendered in step 74 of the brightness and/or color of each of the multiple light beams of the light source for each of the multiple positions traveled by the aerial vehicles are loaded on an aerial light show control system 18.

In exemplary embodiments, the rendering of the pattern 80 in step 74 includes initializing a projection buffer (e.g., "Buffer 1" in FIG. 11), such as an occlusion mask, a frame buffer or a radial buffer, for each of the aerial vehicles 12 to record occlusion or non-occlusion of each of the multiple light beams 16a-16x of the light source 14 for each of the multiple positions traveled by the aerial vehicle 12. A suitable projection buffer can be configured using one or more of a depth buffer, an occlusion mask, etc., as would be apparent to those skilled in the art of 3D computer graphics. In general, the design of a projection buffer may be dictated by the complexity of the visual effects of the light show and the computational constraints, and both buffers and masks may be selectively applied to construct the projection buffer. In some embodiments, the rendering of the pattern 80 further includes initializing one or more additional buffers, such as Buffer 2, Buffer 3, etc., for each of the aerial vehicles 12 to calculate and/or record the brightness and/or color and/or transparency of each of the multiple light beams 16a-16x of the light source 14 for each of the multiple positions traveled by the aerial vehicle 12. Use of additional buffers and masks, such as a color buffer, transparency (alpha) buffer, stencil buffer, depth buffer, texture buffer, etc. is well known in the art of 3D computer graphics. Data stored in these various buffers ("Buffer 1", "Buffer 2", "Buffer 3", etc.) including the projection buffer may be combined to render the pattern 80 as shown in FIG. 11. Additionally the data may be utilized to realize computational efficiencies. It should be noted that the buffers exist for each aerial vehicle.

In various embodiments, the method for an aerial light show may include updating transformations to align an origin of an aerial vehicle 12 to an origin of the virtual 3D scene, to facilitate use of the aerial vehicle 12 to present an aerial light show of the virtual 3D scene.

In some embodiments, the method for an aerial light show may include launching the aerial vehicles 12 to move along the paths; and updating the projection buffer (e.g., "Buffer 1" in FIG. 11) for each of the aerial vehicles 12 to reflect the occlusion or non-occlusion of each of the multiple light beams of the light source 14 for each of the multiple positions traveled by the aerial vehicle 12 in the virtual 3D scene. In some examples, the occlusion or non-occlusion may be determined or calculated in real time during the aerial light show, such that step 75 of loading the paths of the aerial vehicles 12 and the pattern 80 onto the aerial light show control system 18 may be performed also in real time during the aerial light show.

In some embodiments, in addition to the projection buffer ("Buffer 1"), one or more additional buffers ("Buffer 2", "Buffer 3", etc.) too may be updated for each of the aerial vehicles 12 to reflect the brightness and/or color and/or transparency of each of the multiple light beams of the light source 14 for each of the multiple positions traveled by the aerial vehicle in the virtual 3D scene. For example, these additional buffers may be updated in real time during the aerial light show, such that step 75 of loading the paths of the aerial vehicles 12 and the patterns 80 onto the aerial light show control system 18 may be performed in real time during the aerial light show.

In other embodiments, step 75 of loading the paths of the aerial vehicles 12 and the patterns 80 on the aerial light show control system 18 may be performed prior to a start of the aerial light show. For example, the paths of the aerial vehicles 12 and the patterns 80 may be fully pre-configured and loaded onto the control system 18 prior to a start of the aerial light show.

In some embodiments, the method for an aerial light show may include detecting a change in orientation of an aerial vehicle 12; and updating transformations to align an origin of the aerial vehicle 12 to an origin of the virtual 3D scene to compensate for the change in orientation. For example, as described above in reference to FIGS. 7, when the control processor 40 of the aerial vehicle 12 detects a change in orientation of the aerial vehicle 12 based on readings from the on-board sensor(s) 46 and/or the GPS 45, the control processor 40 may use the orientation control 48 to compensate for the change in orientation. One method of compensating for the change in orientation is to update transformations to align an origin of the aerial vehicle 12 to an origin of the virtual 3D scene.

In some embodiments, the method for an aerial light show may include, upon detecting a change in orientation of the aerial vehicle 12, adjusting orientation of the light source 14 of the aerial vehicle 12 to facilitate projection of the multiple light beams in the multiple specified directions, respectively. For example, the control processor 40 may use the orientation control 48 (FIG. 7) to drive the 3-axis steering mechanism comprising one or more motors to adjust one or more of yaw, pitch and roll of the light source 14.

Figure 12:
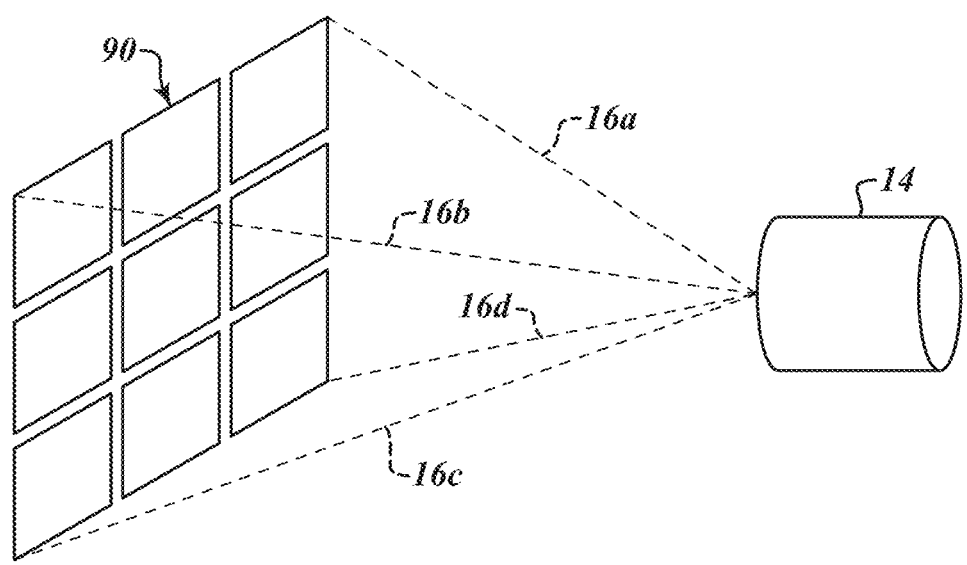
FIG. 12 illustrates the light beams from a light source intersecting with a plane perpendicular to the projection axis direction, limited by the configuration of the light source (e.g., projector).

Referring to FIGS. 11 and 12, methods and techniques for generating the light patterns 80 are described. After the aerial vehicles 12 with light sources 14 are assigned to multiple positions that are traversed by the aerial vehicle 12, given the locations of those multiple positions relative to the virtual 3D scene model, the control system 18 of the aerial light show system 10 may compute the appropriate light patterns (or light projection patterns) 80 so that each light beam from each pixel of each projector (light source 14) reflects not only the 3D model color and brightness, but also takes into account any intersection (or interaction) with the virtual 3D model which may occlude or modulate the brightness and/or color of the light beam. These rendered projection patterns 80 are loaded into the show controller, which may be the same as the control system 18 in various embodiments.

The following describes methods and techniques for determining the appropriate light patterns 80 for each light source 14 (e.g., projector) corresponding to a desired 3D scene. Conventional aerial light shows simply assign a color and/or brightness to each point occupied by an aerial vehicle. In various embodiments of the present invention, on the other hand, the use of the light sources 14 (e.g., projectors) allows independent control of brightness and/or color in each of the many light beams projected in different directions from each light source 14.

By using coordinate transformations to associate each aerial vehicle's position in the physical world with its respective position in the virtual 3D scene, it is possible to control each light beam based on interactions with 3D objects in the virtual 3D scene to account for occlusion and other color modifications. For the case of occlusion, when a light beam intersects any surface in the 3D scene, occlusion occurs for that viewing direction and the light beam is not emitted, as shown in FIG. 8C ("Beam 2"). For the case of transparency, many intersections of a light beam with model elements combine to determine the color of the light beam.

Many methods for representing 3D scenes are well known in the art and are appropriate for use in various embodiments of the present invention. Broad categories of volumetric and solid models are well known along with methods for converting between the two. In exemplary embodiments, we consider a virtual 3D scene as being represented in terms of ordered and connected vertices that define points, edges, and planar surfaces that describe their geometry and topology in terms of a surface mesh. We may consider 3D objects, solid or hollow, as being described by the surface mesh. Even when a complex or curved object is desired, the underlying representation can be a series of connected planar objects or polygons, such as triangles, defined with 3D vertices and oriented in 3D space. Each planar surface forming the 3D model has a front face, associated with the outward surface of the 3D object, and a back face, associated with the interior surface of the 3D object. A surface normal indicates the intended orientation of each planar polygon within the mesh that defines the 3D object. In various embodiments of the present invention, light sources 14 (e.g., projectors) associated with a 3D model point, edge or surface on the virtual 3D object may not need to emit light in the direction of the back of the surface. It should be noted that the association of a light source 14 with a location on the virtual 3D model is within the purview of the aerial light show designer. Many variations exist for how the aerial vehicles 12 are distributed through the virtual scene. Regardless of the number of aerial vehicles 12 or how they are associated with the 3D model, all virtual scene elements will be processed for each light source 14 to properly determine occlusion and transparency for the entire 3D scene. Depending on various factors such as computational constraints or model complexity, this can be done by first considering each projector and each beam from each projector and computing how each beam intersects the virtual world, or it may be done by first considering elements in the virtual world and how they would occlude viewpoints along the path between the projector and viewpoints. Alternately, a combined approach can be used to compute some of the beams.

The number of vertices, polygons, and objects in the virtual representation is independent of the number of aerial vehicles 12 with light sources 14. In some applications, the number of aerial vehicles is typically smaller than the number of vertices. Both the number of vertices and the number of aerial vehicles 12 affect computational requirements. The present invention offers methods to improve efficiency based on the computations required by the relative complexity of the virtual 3D scene and the relative number of aerial vehicles 12 as well as the projector (light source) capabilities.

By associating each light source 14 (e.g., projector) with a specific location on a virtual 3D model and considering the orientation of the light source 14 with respect the virtual 3D model, only light beams in directions emitted outwardly from the virtual 3D model may need to be computed. Similarly, further reductions in computation are possible by considering the orientation of the light source 14 with respect to the intended viewing area 19, so that only light beams in the direction of the intended viewing area 19 are computed.

In computer graphics, rays are often used as an approximation of light beams which have non-zero angular extent. Since many practical embodiments of the present invention use many narrow beams, we will follow this convention, using a ray as a reasonable approximation of a light beam. It is understood that for light beams of significant angular extent, more sophisticated models may be employed which consider the shape of the light beam and possible overlap among neighboring light beams. It is understood that representing each light beam as a ray allows a light beam to be considered as projecting in a direction from the light source 14 into the 3D scene or in a direction from the 3D scene towards the light source 14. Intersections of the ray with both interior and exterior representations of virtual 3D objects can be computed similarly from either direction. An extension of this is to model the bounding volume of a light beam by multiple rays, as known to those skilled in the art.

Classic graphics techniques produce a 2D image by projecting objects in a 3D virtual world onto a 2D gridded structure, or buffer. Equivalently, one or more rays from each element of a 2D gridded structure is projected into the scene. Elements in the buffer are discretely addressable and generally correspond to displayable pixels on a graphics device. Many techniques exist to gain efficiencies and quality in rendering such as sampling. Typically, multiple corresponding buffers are used to implement various techniques such as depth testing, color blending, and stenciling. Buffer information is combined to create a final color at each pixel on the display device. Well-known discrete techniques are applied to implement occlusion and transparency, as well as to gain computational efficiencies. Occlusion includes using hidden surface techniques supported by a depth buffer. Transparency is achieved by using blending techniques. Efficiencies are gained by treating some buffers as masks, to control computation so that only certain regions are processed as needed or to process different regions in different ways.

Animations may be created by changing light patterns, repositioning the aerial vehicles 12, or using a combination of both. In general, an aerial light show will include a coordinated sequence of aerial vehicle positions and projection patterns 80. These may be synchronized so that patterns 80 and positions related to the same time step are being used and changed in a synchronized way. Exemplary embodiments of the present invention include software and communications methods to control synchronization of projection patterns 80 and aerial vehicle positions.

For convenience of discussion, it is sufficient to describe methods of creating a projection pattern 80 with respect to a single light source 14 (e.g., projector), while keeping in mind that this process applies to multiple light sources 14 of multiple aerial vehicles 12.

In exemplary embodiments, a buffer is represented as a 2D gridded structure, which can be conceived as an overlay on a planar surface in 3D space. (See FIG. 11). The buffer has a plurality of discrete, addressable elements, each of which controls an individual light beam projected from the light source 14. The number, meaning and relation among elements can be defined in terms of the light source's capabilities and configuration regarding angular extent of projectable space as well as other information about how the light source 14 is placed in a virtual 3D scene. Each individual buffer element contains information about interactions that affect the light projection pattern 80 at a corresponding position of the light source 14. Information for each element includes color, intensity, distance to 3D model elements, and occlusion. Buffer elements can store results of projector-scene interactions and they can store other information about the projector (the light source 14) or the physical area in which the 3D scene is presented, as might occur to control the show viewing areas 19 or for power savings. Each projection pattern 80 is computed from one or more buffers, such as "Buffer 1", "Buffer 2", "Buffer 3," etc. in FIG. 11.

Control of each light beam 16 to support occlusion effects is achieved by considering how individual geometric primitives project onto the buffer when considering the buffer as a surface placed between the virtual 3D scene objects and the light source 14. There are multiple ways to approach this when modeling a light beam as a ray in virtual 3D space. Similarly, the projection surface need not be planar.

One approach is to consider a projection of virtual 3D scene objects towards the light source 14. This approach can provide an efficient way to identify which light beams are occluded by one 3D scene element. After this is computed for multiple virtual objects in the 3D scenes, buffers can be combined to create a pattern 80 controlling occlusion. In the case of transparency, color information is stored and the buffers can be combined to create patterns 80 to control the brightness. For solid objects, the closest 3D object is sufficient to determine occlusion. For transparency, multiple 3D objects determine the color using a variety of color blending techniques.

Another approach is to consider each gridded element and compute how a ray projected from a light source 14 (e.g., projector) through each gridded element into the 3D scene interacts with virtual 3D scene elements. In classic graphics, for solid objects without light reflections, the first encountered is the nearest and determines the color in an image. All other objects along that ray are occluded. In contrast, in embodiments of the present invention, any solid object along the ray determines occlusion and no color is emitted. Other objects along the ray do not need to be processed. It is possible to apply techniques to gain efficiencies such as sorting algorithms, bounding boxes and related techniques to exclude regions in the buffer and regions in 3D space that do not need to be computed.

In exemplary embodiments, each individual element in the buffer grid is associated with a specific horizontal and vertical projection angle 84 controllable from a specific light source 14, as shown in FIG. 11. The buffer is positioned in 3D space on a planar surface orthogonal to a direction of projection. It should be noted that this will be done for multiple light sources 14 with the same virtual 3D model and with the same light source positioning. Occlusion occurs when a ray (light beam) cast from a single light source in any direction intersects any opaque surface in the 3D scene. Because multiple light beams are individually controllable from a single light source 14, intersection computations are computed for each light beam (or for each projection angle 84) individually and results are stored in corresponding buffer elements. From a single light source 14, some light beams will be occluded, and some light beams will not. Occlusion computations will be performed for a plurality of light beams from each light source 14 of an aerial vehicle for each 3D scene, repeated for multiple timestamp positions traveled by the aerial vehicle, and further repeated for each of a plurality of the aerial vehicles 12 used in an aerial light show.

A sample buffer (e.g., "Buffer 1") in FIG. 11 is represented as a 2D gridded structure and used to compute a light pattern 80 of the brightness and/or color of each of multiple light beams of a light source 14 projected in multiple directions, respectively. In the illustrated buffer, black squares in the portion 82 indicate individual light beams (projected in respective specified directions) that are not emitted, to indicate that a 3D object has occluded them. Such a grid would be associated with each light source 14 used to present the aerial light show. To accommodate transparency, a similar 2D gridded structure (e.g., "Buffer 2," etc.) would store information about adjusting the intensity of the light beam.

While multiple intersections may occur for each ray (light beam), one is sufficient for occlusion (without transparency), but there may be reasons to compute and to store additional information about ray-surface intersections. Other embodiments may include a plurality of 2D gridded buffers for more complex visual effects, such as transparency, and to realize computation efficiencies. Multiple buffers, such as "Buffer 1", "Buffer 2", "Buffer 3," etc. in FIG. 11, can be used to store and compute a resulting color using information from all contributing scene elements for a single point (84) in the pattern 80.

The light patterns 80 projected by each light source 14 can be pre-calculated and stored in the memory 41 on the aerial vehicle 12, being triggered with arrival at each position along the path to be traveled by the aerial vehicle 12. Alternatively, the light patterns 80 can be calculated on the fly, for example by a processor forming the control system 18 and transmitted to the aerial vehicles 12 for immediate use. In various embodiments, the patterns 80 may be transmitted in a compressed form. Examples of appropriate compression schemes include run length encoding, polygonal geometries, JPG, or any of the many image or video compression schemes known in the art.

There are many ways to describe transparency in 3D models. For example, transparency may be a function of a surface, or a property of a bulk material that impacts the light ray as a function of the distance it travels inside the material. In some embodiments of the present invention which allow for transparency, the filtering (either monochrome, or as a function of color) is determined for each light beam that passes through the 3D model. For bulk transparency, this includes finding the distance that each light beam passes through each semi-transparent material. Many techniques exist in visualization for computing transparency through a volume as would be apparent to those skilled in the art.

Alternative embodiments may include projecting one or more 2D polygons onto the projection space. Other embodiments may include methods to identify regions of light control based on the design of the aerial light show area.

In alternative embodiments, computational efficiencies and different representations are realized in various ways. For example, the grid may represent limited angular projection angles based on the light source's capabilities and configuration. In another embodiment, each light beam may be defined to intersect a sphere, or other curved surface, rather than a plane. In the case of a sphere, each light beam passes through the sphere at a unique horizontal and vertical angle of projection associated with each element of a buffer. Other embodiments include limiting the angular resolution based on a predetermined area designated for audience viewers. For example, there would be no need to project any light upwards, where no viewers are expected. Also, the position of a light source 14 on a surface of the 3D model will often immediately determine areas of occlusion based on adjacent surfaces of the 3D model.

While exemplary embodiment of the present invention address occlusion and direct ray-surface intersection tests using geometric methods, the ability to model more sophisticated effects and more efficient computational strategies are possible. For each light source 14, many virtual scene elements may have no effect for certain regions of the pattern. This can be detected using methods that consider a ray as projecting from the light source 14 into the 3D scene as well as methods that consider a ray projecting from the 3D scene towards the light source 14. Techniques include sorting scene elements along a ray or clipping.

Clipping, in classic graphics, identifies regions of scene elements that are inside a 3D volume that contribute to an image. In contrast, embodiments of the present invention employ the concept of identifying regions of space that define occlusion within the projection pattern, which may be termed an "occlusion volume." These regions (occlusion volumes) exclude, or clip, elements to be processed although they are still contributing to the aerial light show display. Alternative embodiments include but are not limited to methods for efficient intersection tests such as the use of hierarchies and bounding boxes, methods for ray intersection with volumetric models, and extraction of surfaces from point clouds.

While exemplary embodiments of the present invention model 3D figures using vertices, other embodiments include virtual 3D scenes expressed in other forms, such as a point cloud or other volumetric models. Similarly, while exemplary embodiments compute intersections between light beams and surfaces of 3D objects, alternative embodiments include light beams (rays) interacting with solid objects and properties associated with the interior of the object as well as the light beams intersecting the front and back side of a surface.

It should be noted that exemplary embodiments include processing of a static 3D scene, other embodiments include processing of an animated 3D scene which can be considered as a series of static 3D scenes. It should be also noted that, while we use a 3-element representation for both vertices and vectors as is common for notational convenience in graphics, a 3D vertex may be represented as a 4-element component using homogeneous coordinates. Those skilled in the art will understand that context clarifies meaning without loss of intended usage.

Multiple coordinate systems are employed to construct most 3D scenes. Typically, each 3D object is defined with respect to its own coordinate system, which we can call the local coordinate system, in a canonical form and placed in a scene at the proper scale, orientation, and position by applying a series of coordinate transformations. The scene itself has a coordinate system that we can call the world coordinate system. Simpler objects are often organized into more complex scenes or hierarchies to create complex figures that can be animated. Matrix transformations and concepts of a matrix stack, scene graph, etc. are methods well known in the art to maintain spatial relations among objects and to animate figures. Transformations can be applied to any object or portion of the scene by modifying the local coordinate system while maintaining the intended position of the figure as a unit within the world coordinate system.

In exemplary embodiments of the present invention, the aerial vehicle 12 carries a light source 14 (e.g., a light projection system) that can be programmed to produce appropriate light patterns visible from different viewpoints. Positioning of the objects in the 3D scene is specified with geometric transformations to place the 3D object in a common reference coordinate system, designated the world coordinate system. By associating the physical position of each aerial vehicle 12 to a corresponding position in the world coordinate system and by computing the physical projection area from that position using the orientation and configuration of the light source 14 on each aerial vehicle 12, it is possible to improve the appearance of an aerial light show by computing occlusion and transparency effects.

In exemplary embodiments, we construct a transformation matrix to align an aerial vehicle 12 with an assigned position in the world coordinate system through a series of transformations that align the aerial vehicle's own local coordinate system with any vertex or point in the world coordinate system through a series of transformations, a technique well-known to those skilled in the art.

A series of transformations allow for position adjustments for a 3D scene changing over time, as is the case for animation. Any changes, in either the aerial vehicle's position, due to drift or other physical forces, or the position of a point with which the aerial vehicle is associated, due to adjustments of the virtual 3D model, can be captured by adjusting the transformation matrix. While one embodiment is to associate an aerial vehicle's position with a vertex position, other embodiments control lights positioned at any point in the 3D space with respect to the 3D scene or with respect to the physical world in which the aerial light show exists.

In some embodiments where the orientation of the light source 14 is not well controlled, it may be necessary to warp the projection pattern 80 to account for the change in orientation. This transformation can be executed locally on the aerial vehicle 12 or can be calculated remotely and transmitted to the aerial vehicle 12.

In other embodiments, additional transformations can be added when a light source 14 position can be adjusted on an aerial vehicle 12. In other embodiments, multiple light sources 14 may be mounted on each aerial vehicle 12 and transformations are added for each of the light sources 14 on the same aerial vehicle 12.

In exemplary embodiments, we use transformation techniques to align each light in 3D model space to determine exactly which light beams, based on angle, should be emitted (not modified) and which light beams should be omitted (modified). Those skilled in the art will understand that properties of matrices and well-known techniques of linear algebra allow computational efficiencies and conveniences to be achieved with techniques, such as pre-multiplication and decomposition. Alternative embodiments achieve efficiencies during model generation. It should also be noted that in some implementations, care must be taken to apply transformations that do not alter normal vectors and other angles required for proper ray (light beam) projection into the model space.

Each light source 14 (e.g., a projector) can emit light beams, or rays, in any direction in 3D space. In exemplary embodiments, we model this configuration in each projector's local coordinate system as a light beam 16a-16d from the center of the projector 14, as illustrated in FIG. 12. That is, a light beam may be defined by each projector's origin through a point in space specified by horizontal and vertical angular offsets from the direction of projection. In exemplary embodiments, the light beam may be written in parametric form to designate any point along the light beam from its point of origin to the far limits of the projection space for that projector 14 within the virtual 3D model. In other embodiments, we may designate a specific reference point along the parameterized ray with respect to a distance from the projector 14 or intersection with geometric elements that are not part of the 3D model. For example, we may define an intersection with a plane 90 which is perpendicular to the direction of projection, limited by the configuration of the projector 12 as illustrated in FIG. 12.

In alternative embodiments, the ray may be defined equivalently using well-known conversions between spherical and Cartesian coordinates. We may also use a series of transformations to position the ray and 3D scene into one common reference coordinate system. We may also allow for non-uniform angular resolution in both the horizontal and vertical directions. In exemplary embodiments, variations in angular resolution and extent of projection angle can be configured depending on the capabilities and settings of the light source 14 itself.

In one embodiment, we define a 2D discrete structure of two dimensions, indexed by (i,j) and incremented by the horizontal and vertical angular resolution of the light source 14, such that the value at any position stores the distance from the light source center of projection to the nearest object in the scene that would occlude or otherwise affect the light emissions from that light source 14 through a point associated with that element of the 2D structure.

In other embodiments, a plurality of 2D gridded parallel structures are defined to store information about the closest interacting model component and to facilitate efficient algorithms. Interactions include anything that will affect that light emitted from that light source 14 in the designated direction. Efficiencies include techniques that eliminate unnecessary computations. Multiple parallel two-dimensional discrete structures with the same resolution and parallel indices account for application of well-known graphics techniques including occlusion and transparency effects. In alternative embodiments, computational efficiencies may be realized by computing these transformations only within an angular range and with angular resolution determined by the specific light source in use.

Additionally, computational efficiencies are achieved in other ways such as the use of bounding blocks and space partitioning for efficient intersection tests.

Exemplary embodiments of the present invention include programmatic control of each aerial vehicle 12, each light source 14, and each light beam 16 emitted from each light source 14. In exemplary embodiments, the aerial light show system 10 is comprised of one or more controlling components with computing and data storage capability, such as the control system 18 of FIG. 3A which may comprise processing components on the ground external to the aerial vehicles 12. Alternative embodiments include systems in which computing and data storage capabilities are available on each aerial vehicle 12, such as in the form of the control processor 40 and the memory 41 in FIG. 7. Other embodiments include computing and storage devices on the ground and/or in the air (e.g., distributed between the aerial vehicles 12 and external computing and storage devices on the ground) to provide efficient control and communications among the aerial vehicles 12 or among subsets or subsystems of the aerial vehicles 12. Exemplary embodiments include wireless communications between an external controller, for example on the ground, and each of the aerial vehicles 12 including the wireless communication module 44, as well as a system for communicating between the aerial vehicles 12. Many options exist for distributing computing, data and communications among the aerial vehicles 12 and/or one or more external processors. Some embodiments include additional units on the ground or in the air to implement other network communication models, such as a mesh network, and to distribute or duplicate computing and data elements. In exemplary embodiments, part of the control system 18 includes computations and data storage components that can be used beforehand to pre-compute and optimize many aspects of the aerial light show as required by hardware, power and physical constraints.

Programmatic control includes data that represents the model of the 3D scene, data that associates each aerial vehicle with a 3D scene position, data describing coordinate transformations among and within the 3D scene and the light sources 14, data that describes physical configuration of each light source 14, data that describes the physical relation of the virtual 3D model to the viewing area 19 and timing data for animated 3D scenes. In alternative embodiments, data resides in whole or in part in a central controller and communicated to each aerial vehicle 12. Data resides in whole or in part in each aerial vehicle 12 may be communicated to a controller or in a peer-to-peer manner to other aerial vehicles 12.

Programmatic control also includes computation that includes alignment and positional adjustments through coordinate transformations, determination of projectable angles, determination of light beam-surface intersections and other adjustments and effects as desired. In various embodiments, computations are carried out by a controller and results communicated to each aerial vehicle 12 and they are computed on each aerial vehicle 12 based on timing and information received from a controller.

In alternative embodiments, computations occur sequentially or in parallel for each aerial vehicle 12 and for each individual light beam 16. Efficiencies are realized by precomputing data that is not likely to change, such as physical configurations of each aerial vehicle 12 and initial flight path for each aerial vehicle 12 to a starting position. It is also possible to precompute every pattern for every light source 14. It is also possible to precompute every pattern for every light source 14 for every time step in the case of an animated aerial display. Depending on the specific embodiment, additional efficiencies can be achieved by structuring data and algorithms to eliminate redundant and inefficient computations.

According to various embodiments as described above, a system and a method are provided for improving the appearance of virtual 3D scenes represented via light sources (lighting units) 14 on a plurality of aerial vehicles 12. One preferred application of the invention is a large-scale aerial presentation of a 3D scene conveyed through light projected from each aerial vehicle 12 to create, in the aggregate, a perception of a 3D figure or scene when viewed from anywhere in the show viewing area 19 (see FIG. 3A). The aerial vehicles 12 are positioned in the 3D scene, typically to points on the intended figure, and each aerial vehicle 12 emits light. In various embodiments, the light is emitted from each aerial vehicle 12 via a projection system (a light source 14) which allows light emitted in different directions to be separately controlled. The position of each aerial vehicle 12 corresponds with a position in the virtual 3D scene. Light rays from each aerial vehicle 12 which would pass through the represented 3D objects are controlled in such a way as to model how light would interact with the 3D object. For completely opaque 3D objects, where the light would be occluded or blocked by the 3D model, no light is sent in that direction in various exemplary embodiments. For objects that are not completely opaque but are semi-transparent (e.g., the sunglasses 28 in FIGS. 6A-6G), the brightness and/or color of the light would be modified to impart a filtering effect or to create a transparency effect. Light beams that do not pass through the 3D model are shown unmodified as to give the appropriate brightness and color for that part of the 3D model that is not occluded by the rest of the 3D model. By independently controlling a plurality of projected light beams 16 from each aerial vehicle 12 in a position-dependent manner that relates each aerial vehicle 12 to a position in the 3D scene and considering light interactions with the 3D model from that position, any member of the audience that is within the show viewing area 19 would thus see the illuminated 3D figure, with the appropriate occlusions and transparency effects. This allows the aerial light show to render 3D scenes that properly present occlusions and other light effects, such as transparency, to thereby create a more compelling 3D effect.

In the prior art, aerial vehicles used for aerial light shows each carries a lighting unit that is designed to provide essentially uniform color and brightness when viewed from any location in the show viewing area. For example, the light unit might be commanded to shine red, and this same red color is visible from anywhere in the show viewing area. When multiple aerial vehicles are deployed for an aerial light show, they are positioned in the sky in such a way so that the light from each aerial vehicle collectively creates a scene visible to viewers on the ground.

In contrast, according to various embodiments of the present invention, the prior art lighting unit is replaced with a light source 14, such as a projector configured to project multiple light beams in multiple specified directions, respectively, wherein the brightness and/or color of each of the multiple light beams is independently controllable. Use of such light sources 14 on the aerial vehicles 12 to selectively emit unmodified or modified light beams in different specified directions to represent the light beams' interaction with the 3D model (e.g., occlusion and transparency) improves the appearance of the 3D model displayed in an aerial light show.

While the present invention has been described via particular embodiments, there are many alternative embodiments that fall within the scope of the invention. For example, the invention is described as applying to aerial vehicles. However, the invention applies equally well to any collection of lighting devices that can be arranged in a space that is observed. These devices could be strung from wires, submerged underwater, embedded in gelatin, or any of a host of other circumstances that could reasonably be envisioned by one knowledgeable in the state of the art.

The invention claimed is:

1. A light show system, comprising:
vehicles configured to move along paths consisting of multiple positions while emitting light beams to present a light show of a virtual 3D scene,
wherein each vehicle includes a light source configured to project multiple light beams in multiple specified directions, respectively, wherein the brightness and/or color of each of the multiple light beams is independently controllable; and
a control system configured to:
control the movement of the vehicles along the paths consisting of the multiple positions; and
control the brightness and/or color of each of the multiple light beams of the light source of each vehicle at each of at least one of the multiple positions of the path traveled by the vehicle, including:
modifying the brightness and/or color of a light beam of each vehicle at each position projected in a specified direction that is occluded by the virtual 3D scene, and
not modifying the brightness and/or color of a light beam of each vehicle at each position projected in a specified direction that is not occluded by the virtual 3D scene.

2. The light show system of claim 1, wherein,
the on/off state of each of the multiple light beams of the light source of each vehicle is independently controllable, and
the control system is configured to control the on/off state of each of the multiple light beams of the light source of each vehicle at each of at least one of the multiple positions of the path traveled by the vehicle, including:

turning off a light beam of each vehicle at each position projected in a specified direction that is occluded by the virtual 3D scene, and turning on a light beam of each vehicle at each position projected in a specified direction that is not occluded by the virtual 3D scene.

3. The light show system of claim 1, wherein the light source is formed of a projector configured to project the multiple light beams in the multiple specified directions, respectively.

4. The light show system of claim 3, wherein the projector employs a spatial light modulator illuminated by a shared lighting source, and is selected from a group consisting of a mirror array, Liquid Crystal Display (LCD), Liquid Crystal on Silicon (LCOS), and film.

5. The light show system of claim 3, wherein the projector employs an array of light emitting devices, and is selected from a group consisting of an Organic Light Emitting Diode (OLED) array and a Light Emitting Diode (LED) array.

6. The light show system of claim 3, wherein the projector is configured to project the multiple light beams of a single color at a given time, wherein the brightness of each of the multiple light beams is independently controllable.

7. The light show system of claim 1, wherein each vehicle includes an orientation control system configured to adjust for a change in orientation of the light source of each vehicle to facilitate projection of the multiple light beams in the multiple specified directions, respectively.

8. The light show system of claim 7, wherein the orientation control system comprises a gimbal.

9. The light show system of claim 7, wherein the orientation control system comprises one or more motors to adjust one or more of yaw, pitch and roll of the light source.

10. A vehicle, comprising:
a processor configured to control movement of the vehicle along a path consisting of multiple positions while emitting light beams to present a light show of a virtual 3D scene; and
a light source controlled by the processor and configured to project multiple light beams in multiple specified directions, respectively;
wherein the processor is configured to control the brightness and/or color of each of the multiple light beams of the light source at each of at least one of the multiple positions of the path traveled by the vehicle, including:
modifying the brightness and/or color of a light beam of each vehicle at each position projected in a specified direction that is occluded by the virtual 3D scene, and
not modifying the brightness and/or color of a light beam of each vehicle at each position projected in a specified direction that is not occluded by the virtual 3D scene.

11. The vehicle according to claim 10, wherein the light source is formed of a projector configured to project the multiple light beams in the multiple specified directions, respectively.

12. The vehicle according to claim 10, further comprising:
one or more sensors configured to detect position and/or orientation of the light source; and
an orientation control system configured to adjust for a change in orientation of the light source to facilitate projection of the multiple light beams in the multiple specified directions, respectively.

13. The vehicle according to claim 12, wherein, the orientation control system comprises a gimbal;

the orientation control system comprises one or more motors to adjust one or more of yaw pitch and roll of the light source; and/or the orientation control system updates transformations to align an origin of the vehicle to an origin of the virtual 3D scene to compensate for the change in orientation.

14. A method for a light show, comprising:
creating a virtual 3D scene;
placing lights in the virtual 3D scene;
assigning paths consisting of multiple positions to be traveled by vehicles including light sources which correspond to the lights placed on the virtual 3D scene to present a light show of the virtual 3D scene, wherein the light source of each vehicle is configured to project multiple light beams in multiple specified directions, respectively, and the brightness and/or color of each of the multiple light beams is independently controllable;
for each vehicle and for each of at least one of the multiple positions of the path traveled by the vehicle, rendering a pattern of the brightness and/or color of the multiple light beams of the light source of the vehicle, wherein the brightness and/or color of a light beam projected in a specified direction that is occluded by the virtual 3D scene is modified, and the brightness and/or color of a light beam projected in a specified direction that is not occluded by the virtual 3D scene is not modified; and
loading to a light show control system the paths of the vehicles and the patterns of the brightness and/or color of the multiple light beams of the light source for each of at least one of the multiple positions traveled by the vehicles.

15. The method for a light show according to claim 14, wherein the rendering of the pattern includes:
initializing a projection buffer for each of the vehicles to record occlusion or non-occlusion of each of the multiple light beams of the light source for each of at least one of the multiple positions traveled by the vehicle.

16. The method for a light show according to claim 15, wherein the rendering of the pattern further includes:
initializing one or more additional buffers for each of the vehicles to record the brightness and/or color and/or transparency of each of the multiple light beams of the light source for each of at least one of the multiple positions traveled by the vehicle.

17. The method for a light show according to claim 15, further comprising:
updating transformations to align a vehicle origin to an origin of the virtual 3D scene.

18. The method for a light show according to claim 15, further comprising:
launching the vehicles to move along the paths; and
updating the projection buffer for each of the vehicles to reflect the occlusion or non-occlusion of each of the multiple light beams of the light source for each of at least one of the multiple positions traveled by the vehicle in the virtual 3D scene, using transformations between launching positions and light show starting positions of the vehicles.

19. The method for a light show according to claim 18, further comprising:
updating one or more additional buffers for each of the vehicles to reflect the brightness and/or color and/or transparency of each of the multiple light beams of the light source for each of at least one of the multiple positions traveled by the vehicle in the virtual 3D scene.

20. The method for a light show according to claim 18, further comprising:
 detecting a change in orientation of a vehicle; and
 updating transformations to align an origin of the vehicle to an origin of the virtual 3D scene to compensate for the change in orientation.

21. The method for a light show according to claim 14, further comprising:
 detecting a change in orientation of a vehicle; and
 adjusting orientation of the light source of the vehicle to facilitate projection of the multiple light beams in the multiple specified directions, respectively.

22. The method for a light show according to claim 14, wherein,
 the loading of the paths of the vehicles and the patterns to the light show control system is performed prior to a start of the light show.

23. The method for a light show according to claim 14, wherein,
 the loading of the paths of the vehicles and the patterns to the light show control system is performed in real time during the light show.

24. The method for a light show according to claim 14, wherein,
 the modifying of the brightness and/or color of a light beam includes turning off the light beam.

25. The method for a light show according to claim 14, wherein,
 the modifying of the brightness and/or color of a light beam includes dimming the light beam and/or changing the color of the light beam.

26. The method for a light show according to claim 14, wherein,
 the virtual 3D scene includes an object and a shadow object placed over the object to occlude light beams projected from the lights sources of the vehicles representing the object.

27. The method for a light show according to claim 14, further comprising:
 restricting a viewing area including viewpoints toward which the light source of each vehicles is configured to project multiple light beams in multiple specified directions,
 wherein the light show is observable only from the viewing area.

* * * * *